(12) United States Patent
Manthiram et al.

(10) Patent No.: US 12,180,601 B2
(45) Date of Patent: Dec. 31, 2024

(54) ELECTROCHEMICAL OXIDATION OF ORGANIC MOLECULES

(71) Applicant: MASSACHUSETTS INSTITUTE OF TECHNOLOGY, Cambridge, MA (US)

(72) Inventors: Karthish Manthiram, Cambridge, MA (US); Kyoungsuk Jin, Cambridge, MA (US); Joseph Maalouf, Cambridge, MA (US); Kindle Williams, Cambridge, MA (US); Minju Chung, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 17/277,063

(22) PCT Filed: Sep. 24, 2019

(86) PCT No.: PCT/US2019/052789
§ 371 (c)(1),
(2) Date: Mar. 17, 2021

(87) PCT Pub. No.: WO2020/068872
PCT Pub. Date: Apr. 2, 2020

(65) Prior Publication Data
US 2021/0371991 A1    Dec. 2, 2021

Related U.S. Application Data

(60) Provisional application No. 62/735,800, filed on Sep. 24, 2018.

(51) Int. Cl.
| | |
|---|---|
| *C25B 3/23* | (2021.01) |
| *C25B 3/05* | (2021.01) |
| *C25B 3/07* | (2021.01) |
| *C25B 9/17* | (2021.01) |
| *C25B 11/052* | (2021.01) |
| *C25B 11/065* | (2021.01) |
| *C25B 11/077* | (2021.01) |
| *C25B 11/091* | (2021.01) |

(52) U.S. Cl.
CPC .............. *C25B 3/23* (2021.01); *C25B 3/05* (2021.01); *C25B 3/07* (2021.01); *C25B 9/17* (2021.01); *C25B 11/052* (2021.01); *C25B 11/065* (2021.01); *C25B 11/077* (2021.01); *C25B 11/091* (2021.01)

(58) Field of Classification Search
None
See application file for complete search history.

(56) References Cited

U.S. PATENT DOCUMENTS

| | | |
|---|---|---|
| 3,427,235 A | 2/1969 | Le Duc |
| 4,450,055 A | 5/1984 | Stafford |

(Continued)

OTHER PUBLICATIONS

Ye et al. "Selective Anodic Oxidation of Camphor", Tetrahedron, vol. 47, No. 29, Jul. 15, 1991 (Jul. 15, 1991), p. 5463-5470.

(Continued)

*Primary Examiner* — Wojciech Haske
(74) *Attorney, Agent, or Firm* — NIELDS, LEMACK & FRAME, LLC

(57) ABSTRACT

A system and method for oxidizing organic molecules as an oxygen-atom source using an electrochemical process is described.

18 Claims, 25 Drawing Sheets

+    +

Water as a sustainable oxygen-atom source

Valuable and easily separable side product

(56) References Cited

U.S. PATENT DOCUMENTS 6,764,589 B1 7/2004 Putter
2018/0023199 A1 1/2018 Sun

OTHER PUBLICATIONS

Sumboja et al. "Manganese Oxide Catalyst Grown on Carbon Paper as an Air Cathode for High-Performance Rechargeable Zinc-air Batteries", ChemPlusChem, vol. 8, issue 8, Jun. 18, 2015 (Jun. 18, 2015), p. 1341-1346.
Qiao et al. "Single-atom catalysis of CO oxidation using Pt1/FeOx", Nature Chemistry, vol. 3, Jul. 22, 2011 Jul. 22, 2011), p. 634-641.
International Search Report mailed on Dec. 18, 2019 in corresponding International Patent Application No. PCT/US2019/052789.
Written Opinion of the International Searching Authority mailed on Dec. 18, 2019 in corresponding International Patent Application No. PCT/US2019/052789.

ELECTROCHEMICAL OXIDATION OF ORGANIC MOLECULES

CLAIM OF PRIORITY

This application is a National Phase application filed under 35 USC § 371 of International Application No. PCT/US2019/052789, filed on Sep. 24, 2019, which claims to the benefit of prior filed U.S. Provisional Patent Application No. 62/735,800, filed Sep. 24, 2018, each of which is incorporated by reference in its entirety.

FIELD OF THE INVENTION

The invention relates to systems and methods for the manufacture of oxidized organic molecules.

BACKGROUND

Epoxides are versatile chemical building blocks that are ubiquitous in the industrial synthesis of plastics, adhesives, detergents, solvents, and pharmaceuticals. These epoxides are produced through methods which are inefficient, involve hazardous intermediates, or generate stoichiometric side products. For instance, ethylene oxide is produced from ethylene and oxygen by reaction at 220-280° C. and 150-440 psi; the use of elevated pressures and temperatures limits modularity. Furthermore, ethylene oxide is one of a small number of epoxides which can be produced via direct oxidation of an olefin. More complex epoxides generally require the use of a peroxide oxidant such as hydrogen peroxide or meta-chloroperoxybenzoic acid, which can be difficult to handle or can generate stoichiometric side products that have little commercial value.

SUMMARY

In one aspect, a method of generating an oxidized substrate can include contacting an anode including an oxygen atom transfer catalyst composition with a substrate, contacting the anode with an oxygen atom source, and applying a voltage across the anode and a cathode to produce an oxidized substrate. In addition to creating epoxides, the functionalization of substrates to add oxygen-atoms to form alcohols, ketones, aldehydes, acids, esters, and lactones is of interest.

In certain circumstances, the oxygen atom transfer catalyst composition can include a metal oxides, metal hydroxide, metal phosphate, metal borate, metal sulfide, metal phosphide, or metal nitride, or combinations thereof. For example, the oxygen atom transfer catalyst composition can be a manganese oxide, a titanium oxide, a copper oxide, a zinc oxide, a cobalt oxide, a cobalt phosphide, an iron oxide, a nickel oxide, an iridium oxide, a platinum oxide, or a chromium oxide. The oxygen atom transfer catalyst composition can include a metal including rhenium, iridium, platinum, silver, gold, ruthenium, rhodium, or palladium. In certain circumstances, the oxygen atom transfer catalyst can include single atoms of one element of Re, Ir, Pt, Au, Ru, Rh, or Pd supported on a nanostructured material containing an oxide or metal nanoparticle including Ti, Cr, Mn, Fe, Co, Ni, Cu, or Zn. The oxygen atom transfer catalyst can be an epoxidation catalyst, a ketone-formation catalyst, an aldehyde-formation catalyst, an ester formation catalyst, or an alcohol-formation catalyst. The ester formation catalyst can be a lactone formation catalyst.

In certain circumstances, the oxidized substrate can be produced at a Faradaic yield of at least 20%, at least 30% or at least 40%.

In certain circumstances, the oxygen atom source can be water, for example, without the need to generate a soluble oxidant from the water.

In certain circumstances, the cathode can include a hydrogen generation catalyst.

In certain circumstances, hydrogen gas can be produced at the cathode.

In certain circumstances, the cathode can include an oxygen reduction catalyst.

In certain circumstances, oxygen can be introduced at the cathode and water is produced.

In certain circumstances, a hydrogenation reaction of an organic substrate can be conducted at the cathode.

In certain circumstances, hydrogen gas can be produced at a Faradaic yield of at least 70%, at least 80% or at least 90%.

In certain circumstances, the substrate can be an olefin that is oxidized to form an epoxide or ketone, a ketone that is oxidized to form an ester, or the substrate contains a C—H bond oxidized to form a product containing a carbon-oxygen bond, such as an alcohol, aldehyde, ketone, or carboxylic acid. The substrate can be an alkaryl compound. The aralkyl compound can be a C1-C6 alkylphenyl-containing compound. The oxidized substrate can be an epoxide, an ester, a ketone, an alcohol or an aldehyde.

In certain circumstances, the substrate can be supplied to the anode at a concentration of 5 mM, 10 mM, 15 mM, 20 mM, 25 mM, 30 mM, 35 mM, 40 mM, 50 mM, 60 mM, 70 mM, 80 mM, 90 mM, 100 mM, 200 mM, 250 mM, 300 mM, 350 mM, 400 mM, 450 mM, 500 mM, 1 M, 2 M, 4 M, 6 M, 8 M, or 10 M.

In certain circumstances, the oxygen atom source can be supplied at a concentration of 0.1 M, 0.25 M, 0.5 M, 1 M, 2 M, 4 M, 6 M, 8 M, 10 M, 12 M, 14 M, 16 M, 18 M or 20 M.

In certain circumstances, the voltage can be between about 0.2V and 9.0V, between about 0.4V and 5V, or between about 0.6V and 2.0V. For example, the voltage can be 0.5V, 0.6V, 0.7V, 0.8V, 0.9V, 1.0V, 1.1V, 1.2V, 1.3V, 1.4V, 1.6V, 1.7V, 1.8V or 1.9V.

In certain circumstances, the cathode can include a noble metal, nickel-molybdenum-zinc alloys, cobalt phosphide, or nickel phosphide.

In certain circumstances, the method can be carried out substantially at room temperature.

In another aspect, a method of manufacturing an oxygen atom transfer catalyst can include depositing particles of an oxygen atom transfer catalyst composition on an electrode surface.

In certain circumstances, the particles can be nanoparticles.

In certain circumstances, the electrode surface can be a surface of carbon paper.

In another aspect, a system for forming an oxidized substrate and an oxygen atom source can include a housing, a cathode within the housing, an anode including an oxygen atom transfer catalyst composition within the housing, and a voltage supply configured to apply a voltage to the anode and the cathode.

In certain circumstances, the system can include a substrate inlet to the housing configured to contact the substrate with the anode.

In certain circumstances, the system can include a first outlet of the housing to release the epoxidized substrate from the housing.

In certain circumstances, the system can include a second outlet of the housing to release hydrogen.

In certain circumstances, the anode can include carbon.

In certain circumstances, the cathode can include a hydrogen catalyst composition.

Other aspects, embodiments, and features will be apparent from the following description, the drawings, and the claims.

DETAILED DESCRIPTION

Figure 1:
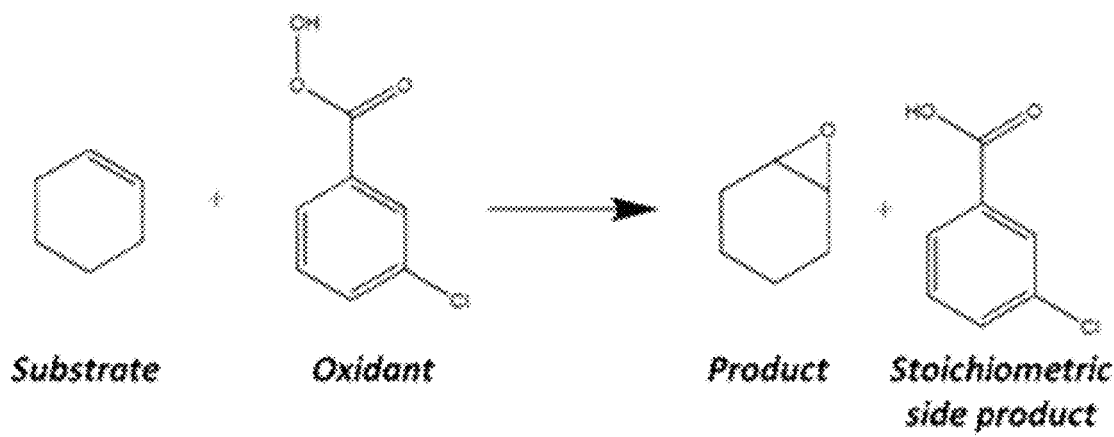
FIG. 1 depicts a traditional epoxidation scheme.

In general, systems and methods for the manufacture of an oxidized product from carbon-carbon double bonds (olefins), carbon-carbon bonds, or carbon-hydrogen bonds can include electrochemical oxidation of water to produce an oxidized product, such as an epoxide, a ketone, an aldehyde, an alcohol, or an ester (for example, a lactone or cyclic ester) and hydrogen gas. Referring to FIG. 1, traditional method for the epoxidation of an olefin substrate can generate an epoxide. The traditional method generates stoichiometric side products, which require additional separation steps, and involves handling of reactive peroxides, which pose significant safety hazards. Epoxidation chemistry is widely conducted in the chemical industry, by companies such as Dow and BASF; these companies have focused many resources on developing cleaner routes. Past approaches which have been disclosed require use of peroxide as an intermediate (EP0712851A1, which is incorporated by reference in its entirety) or elevated temperatures which limit modularity (EP2542340A4, which is incorporated by reference in its entirety). See, for example, Arpe, Hans-Jurgen, *Industrial Organic Chemistry*, Wiley, New York (2010), which is incorporated by reference in its entirety.

Figure 2:
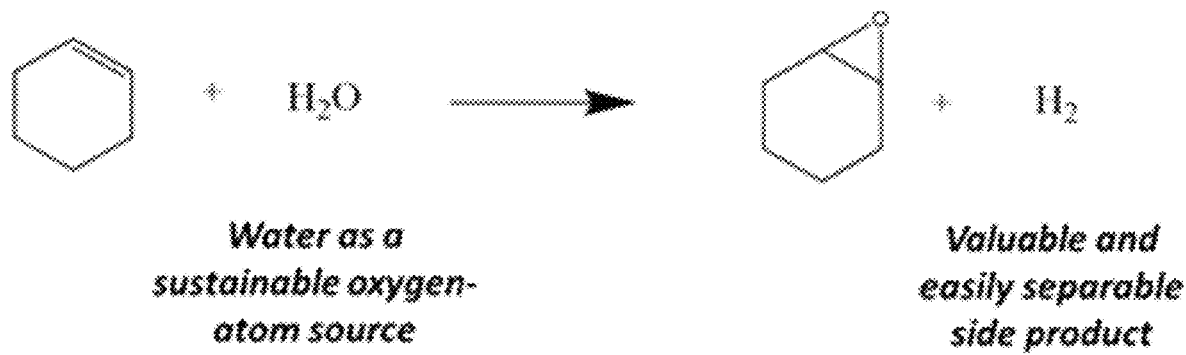
FIG. 2 depicts an electrochemical epoxidation scheme.
Figure 3A:
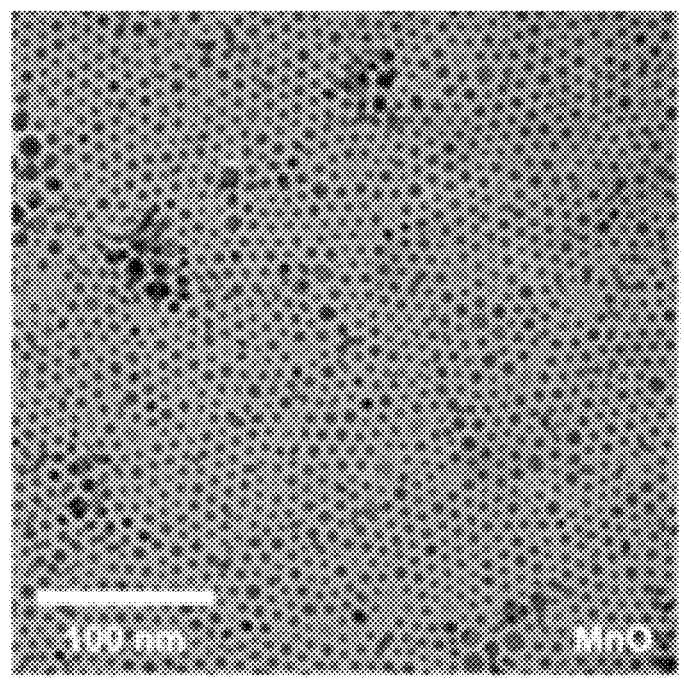
FIG. 3A depicts a micrograph of manganese oxide nanoparticles.
Figure 3B:
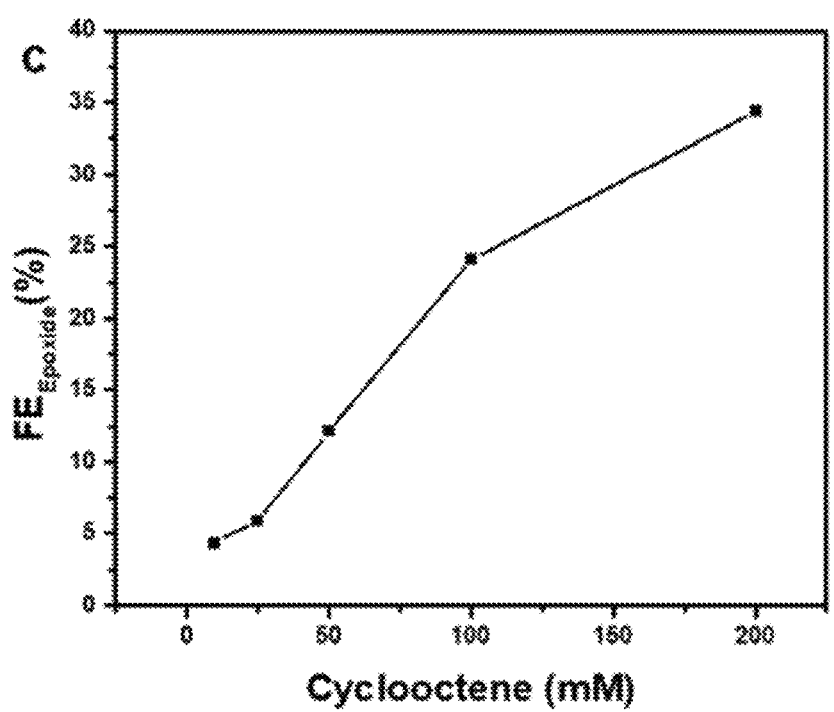
FIG. 3B depicts a graph showing Faradaic efficiency for epoxide production.

The methods described here create a new path forward for sustainable design of oxidation reactions. A method of using electricity, which can be derived from renewable sources, to convert a substrate into an oxidized substrate at room temperature and ambient pressure, can use water as the oxygen atom source. See, FIG. 2. This method of epoxidizing olefins uses water as the oxygen-atom source to generate epoxides and hydrogen gas. The reaction can be conducted in an electrochemical cell under ambient conditions in a non-aqueous solvent. The reaction is catalyzed using manganese oxide nanoparticles at the anode (FIG. 3A). The method operates at relatively high current densities and is efficient (FIG. 3B).

Referring to FIG. 3A, manganese oxide nanoparticles can be used as the catalyst in the method described herein. Referring to FIG. 3B, Faradaic efficiency for epoxides ($FE_{epoxide}$) is defined as the fraction of electrons that go towards the desired epoxidation product, as a function of cyclooctene concentration. In the experiments described here, the reaction has already reached a 40-50% $FE_{epoxide}$ even while using a highly stable oxygen-atom source, water. This is the first catalyst developed that can use water as the direct oxygen-atom source for epoxidation of olefins. This catalyst has not been previously reported for this reaction. In addition to the method of oxidizing, the method of preparing the catalyst, the composition of the catalyst, and its application towards electrochemical olefin epoxidation using water as oxygen atom source are all part of the innovation described herein.

The method has several advantages compared to existing processes:

Operates at room temperature and pressure, enabling modular reactor design.

Driven by renewable sources of electricity, dramatically reducing carbon footprint for epoxide synthesis.

Water is a sustainable oxygen-atom source.

Generates valuable hydrogen from dissociation of water, which can be integrated into local chemical production processes or sold as a commodity chemical.

No stoichiometric side products which need to be separated or disposed.

Figure 13:
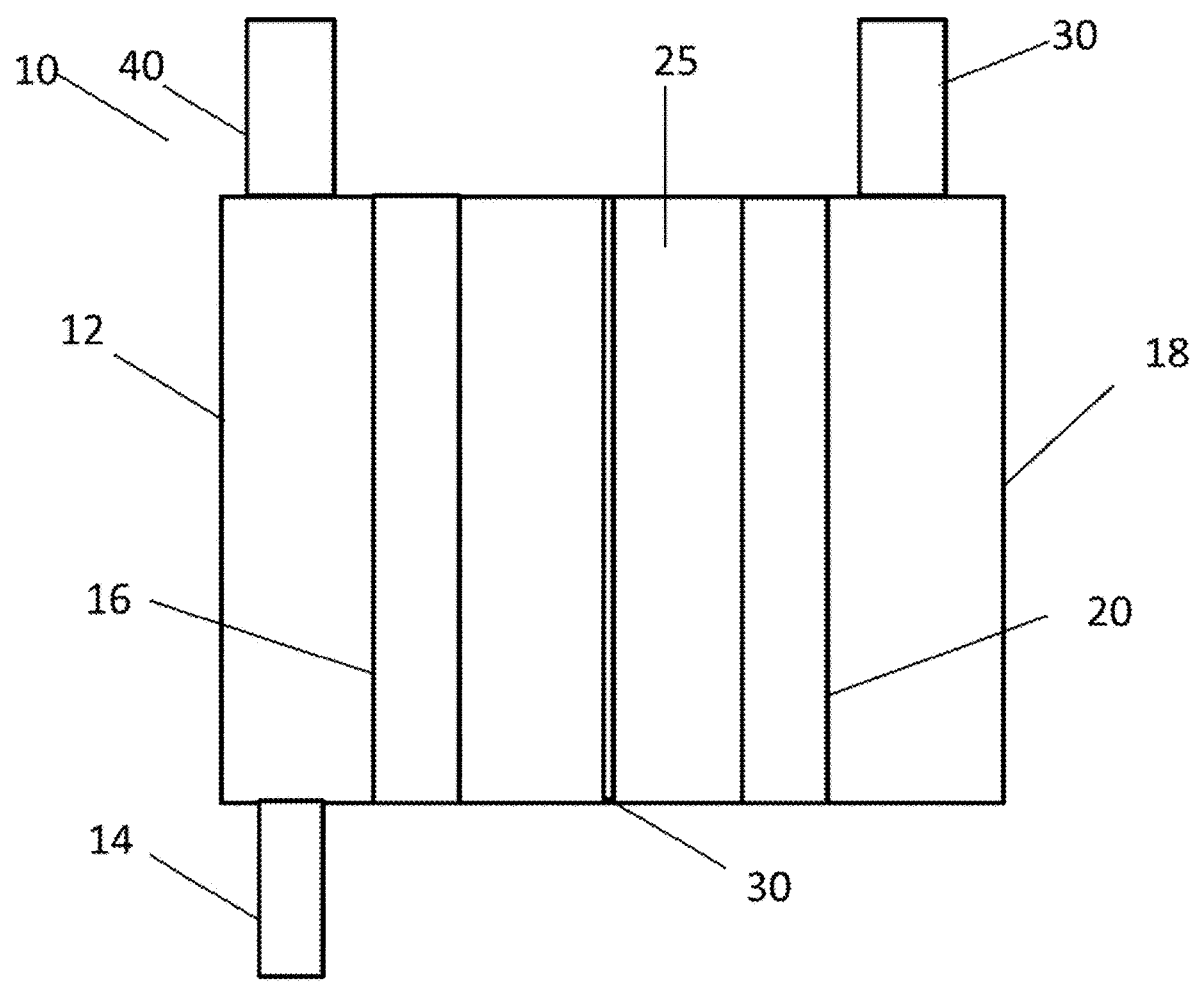
FIG. 13 depicts a system for epoxidizing substrates.

Referring to FIG. 13, oxidized substrate manufacturing system 10 includes a housing 12, anode 16, and cathode 20. A voltage can be applied to the anode and the cathode. Anode 16 can include an oxygen atom transfer catalyst composition. Substrate inlet 14 can be used to introduce a solution include the substrate that will be epoxidized, such as an olefin, into the housing 12. Cathode 20 in housing 18 is opposite anode 16. Cathode 20 can include a hydrogen generation catalyst. A separator 30 can be present between anode 16 and cathode 20. An electrolyte fluid 25 can be positioned between anode 16 and cathode 20. If the solution includes water, or another oxygen source susceptible to electrochemical activation, a reactive oxygen atom species can be generated. The solution can flow through housing 12, including the oxidized product, can be carried out of outlet 40. Hydrogen gas generated at cathode 20 can exit housing 18 through port 30. Housing 12 and housing 18 can be separate structures or can form a single structure.

The solvent can be an inert organic solvent that can form a solution with the substrate. Water can be introduced into the solution. The concentration of the substrate can be 5 mM, 10 mM, 15 mM, 20 mM, 25 mM, 30 mM, 35 mM, 40 mM, 50 mM, 60 mM, 70 mM, 80 mM, 90 mM, 100 mM, 200 mM, 250 mM, 300 mM, 350 mM, 400 mM, 450 mM, or 500 mM. The concentration of the water can be 0.1 M, 0.25 M, 0.5 M, 1 M, 2 M, 4 M, 6 M, 8 M, 10 M, 12 M, 14 M, 16 M, 18 M or 20 M.

The temperature and pressure can be ambient temperature and pressure.

Alternatively the reaction can take place in a gas phase. When in the gas phase, a porous anode can support an epoxidation catalyst composition that can be exposed to the substrate. The porous anode can be, for example, a porous carbon anode. Water can be used as the oxygen source.

The voltage can be between about 0.2V and 9.0V, between about 0.4V and 5V, or between about 0.6V and 2.0V. For example, the voltage can be 0.5V, 0.6V, 0.7V, 0.8V, 0.9V, 1.0V, 1.1V, 1.2V, 1.3V, 1.4V, 1.6V, 1.7V, 1.8V or 1.9V.

The cathode can be or can include a noble metal, for example, platinum or palladium, or a carbon electrode. The anode can be or can include a noble metal, for example, platinum or palladium, or carbon.

Figure 8:
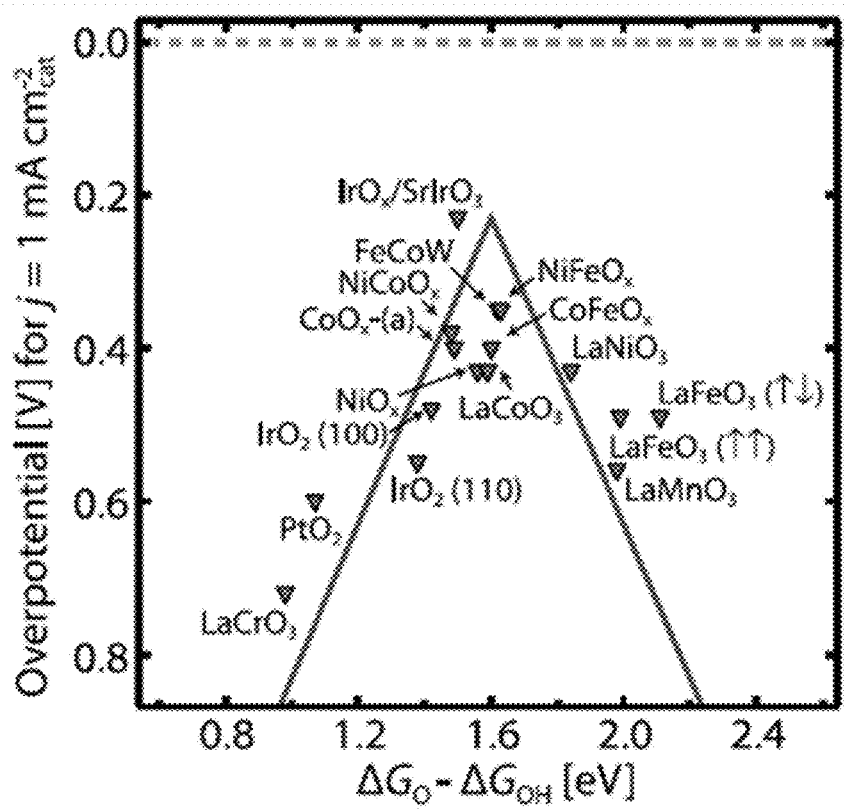
FIG. 8 depicts a Volcano plot.

The oxygen atom transfer catalyst can be an oxygen atom transfer catalyst composition on the anode of the device. The oxygen atom transfer catalyst composition can include metal oxides, hydroxides, phosphates, borates, sulfides, phosphides, or nitrides, as well as combinations of these compounds. Generally, catalysts which have previously been tested for water oxidation (FIG. 8) may be incorporated as catalysts for use in the current process. FIG. 8 is a Volcano plot for various water oxidation catalysts (Science 355, 6321 eaad4998 (2017), which is incorporated by reference in its entirety). Metal sulfide, phosphide, or nitride (ACS Energy Lett. 2, 1937 (2017), which is incorporated by reference in its entirety) based catalysts have been extensively studied as water oxidation catalysts. Notably, some catalysts which are poor at water oxidation may perform better for olefin oxidation due to differences in the rate determining steps. The shared trait of the catalytic materials suitable for oxidation is that they form oxygen-species at their surfaces, such as metal oxo species, which then react with the olefin substrate to form an oxide. The oxygen atom transfer catalyst composition can be a coating of material in a binder or coated on an electrode surface. For example, the oxygen atom transfer catalyst composition can be a nanoparticle composition, where the nanoparticles have diameters of 1 to 100 nm. For example, the oxygen atom transfer catalyst composition can be a manganese oxide, a titanium oxide, a copper oxide, a zinc oxide, a cobalt oxide, a cobalt phosphide, an iron oxide, a nickel oxide, an iridium oxide, a platinum oxide, or a chromium oxide. Under catalytic conditions, the active form of the catalyst may become a metal hydroxide, peroxide, or combination thereof. The composition can evolve to a different active form under catalytic conditions. Alternatively, the oxygen atom transfer catalyst composition can be a compound tethered to a matrix material, for example, a polymer. These materials could be decorated with single and few atom dopants on their surfaces, prepared in core-shell morphologies, and with size and shape control.

High surface area morphologies such as nanoparticles are preferable to increase catalytic surface area, although lower surface area morphologies can also conduct the reaction. Catalytic nanoparticles may be prepared by various methods, including but not limited to colloidal synthesis (hot-injection/heat-up method), solvothermal synthesis, or hydrothermal synthesis. These nanoparticles may then be deposited on high surface area catalytic supports, such as carbon papers or carbon cloths, or on lower surface area supports, such as foils or metal plates. Catalysts may also be prepared by electrodeposition from metal salts in an electrolyte onto one of the aforementioned catalytic supports. Electrodeposition is a facile synthesis route to prepare the catalysts, as has been reported for cobalt phosphate (Science, 321, 1072 (2008), which is incorporated by reference in its entirety), nickel borate (PNAS 107, 10337, (2010), which is incorporated by reference in its entirety), and manganese oxide (Energy Environ. Sci. 5, 7081 (2012), which is incorporated by reference in its entirety) in the context of water oxidation. In certain circumstances, the catalyst can be a single atom catalyst. For example, an oxygen atom transfer catalyst composition can include a metal on a metal oxide support. The metal can be rhenium, iridium, platinum, silver, gold, ruthenium, rhodium, or palladium. The metal oxide can be an oxide of a transition metal such as titanium, chromium, manganese, iron, cobalt, nickel, copper or zinc. The metal oxide can be a nanoparticle, for example, a particle having a size of 1 nm to 100 nm, or 3 nm to 50 nm. The metal can be a single atom of metal or a metal cluster on the metal oxide support.

The hydrogen catalyst composition can include metal particles, for example, noble metal particles, such as platinum, gold, or palladium.

The oxygen atom transfer catalyst composition or hydrogen catalyst composition can be deposited on a porous electrode material. The porous electrode material can be carbon fibers, carbon paper, carbon cloth, wire mesh, metal foils, or metal plates.

A number of reaction substrates are suitable for the oxidation reaction. The substrates applicable to method described herein are those which contain olefins, or ketones, or alkylbenzene groups. This includes cyclic and acyclic alkenes, as well as aliphatic and non-aliphatic olefins. The olefins may also be of either cis or trans stereochemistry. Monoolefins, diolefins, and triolefins may also be used. Diverse functional groups may be present in the vicinity of the olefin. Examples of simple substrates include ethylene, propylene, allyl alcohol, cyclohexene, cyclooctene, as well as derivative of these compounds. Example of products containing epoxides which may be accessed include the corresponding epoxides of the aforementioned olefins, as well as 3,4-epoxycyclohexylmethyl-3',4'-epoxycyclohexane carboxylate, Bisphenol A diglycidyl ether, and epoxidized linolein. Pharmaceutical compounds which require an epoxide intermediate may also be accessed through the present invention. The epoxides produced through these routes may be used as chemical intermediates or as final products in diverse applications, including but not limited to stabilizers, plasticizers, demulsifiers, surface coatings, pharmaceuticals, sanitary chemicals, sterilization, gelation of solid propellants, epoxy resins, and polymers. More generally, the method described here can be used in place of those prior methods in which epoxides are produced via: 1) heterogeneously-catalyzed thermocatalytic oxidation of alkenes, as done for the production of ethylene oxide, 2) organic peroxides or organic peroxyacids with or without metal catalyst, 3) dehydrohalogenation of halohydrins, 4) hydrogen peroxide with or without metal catalysts, and 5) nucleophilic epoxidation.

In general, the viable substrates for olefins can be summarized by the general structure,

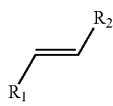

where $R_1$ and $R_2$ can by any organic or inorganic group; $R_1$ and $R_2$ may also be connected, as in the case of a cyclic olefin.

A variety of reactor designs can implement the method. The method described herein can be performed under various different electrochemical cell geometries and configurations, which include an anode and cathode, connected to an external power source, with an ionically conductive medium between the two electrodes. A third reference electrode may be incorporated if necessary for control of the potential at the electrodes. The process may be conducted under batch or continuous conditions. An ionically conductive membrane, such as Nafion or Selemion, or a separator, such as Celgard or Duramic, can be used in the structure, but is not required.

The overall reaction may be tuned by choice of the cathode and the reactor conditions. For instance, if oxygen is flowed to the cathode, then oxygen will be reduced to generate water; in this case the overall reaction is that of an olefin and oxygen to generate an oxide. In the absence of oxygen, hydrogen will be generated at the cathode; in this case the overall reaction is that of an olefin and water to generate an oxide and hydrogen.

A simple parallel-plate geometry with intervening electrolyte may be used. For instance, a high surface area carbon paper coated with manganese oxide may be used as the anode and a carbon paper bearing platinum nanoparticles used as the cathode. These may be immersed in a mixed solvent consisting of water and a non-aqueous solvent, including but not limited to acetonitrile, DMSO (dimethyl sulfoxide), DMF (dimethylformamide), THF (tetrahydrofuran), DCM (dichloromethane), and propionitrile. The non-aqueous solvent contains a conductive salt such as $TBABF_4$ (Tetrabutylammonium tetrafluoroborate), $TBAPF_6$ (Tetrabutylammonium hexafluorophosphate), $NaClO_4$(Sodium perchlorate), $LiClO_4$(Lithium perchlorate), or TEAP(tetraethylammonium perchlorate), or a combination thereof. The non-aqueous solvent assists substrate solubility while the water is the O-atom source for oxidation.

Figure 9:
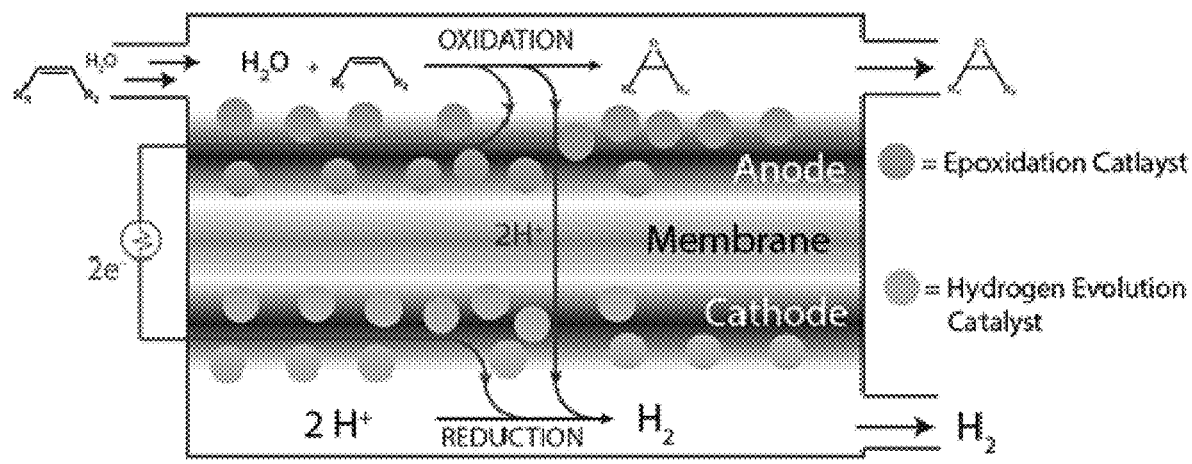
FIG. 9 depicts a system for electrochemical epoxidation.

Alternatively, the reaction may be conducted using a membrane electrode assembly, in which a high surface area anode and cathode are in intimate contact with an ionically conductive membrane, which acts to transport protons, hydroxides, or other ionic species between the two electrodes (FIG. 9). Referring to FIG. 9, a configuration of a continuously operated cell is shown in which water and a general olefin substrate are flowed into the cell and the corresponding epoxide flows out of one output port and hydrogen gas flows out of a second output port.

The direct transfer of an oxygen atom into a target substrate has been a fundamental reaction in organic chemistry, but not using the method described herein. In the past, over several decades, these types of reactions have been intensely investigated in order to make many key chemical feedstocks. See, Yan, M., Kawamata, Y. & Baran, P. S. Synthetic Organic Electrochemical Methods since 2000: On the Verge of a Renaissance. *Chem. Rev.* 117, 13230-13319 (2017), Holm, R. H. Metal-Centered Oxygen Atom Transfer Reactions. *Chem. Rev.* 87, 1401-1449 (1987), and Xia, Q.-H., Ge, H.-Q., Ye, C.-P., Liu, Z.-M. & Su, K.-X. Advances in Homogeneous and Heterogeneous Catalytic Asymmetric Epoxidation. *Chem. Rev.* 105, 1603-1662 (2005), each of which is incorporated by reference in its entirety. In nature, several metalloenzymes exist that allow for various oxygen atom transfer reactions (OAT) under ambient conditions. See, Engelmann, X., Monte-Perez, I. & Ray, K. Oxidation Reactions with Bioinspired Mononuclear Non-Heme Metal-Oxo Complexes. *Angew. Chemie—Int. Ed.* 55, 7632-7649 (2016), and Jin, S., Makris, T. M., Bryson, T. A., Sligar, S. G. & Dawson, J. H. Epoxidation of olefins by hydroperoxo-ferric cytochrome P450. *J. Am. Chem. Soc.* 125, 3406-3407 (2003), each of which is incorporated by reference in its entirety. The active sites consist of high-valent transition metal-oxo species, allowing for various OAT reactions, such as C—H bond activation, hydroxylation, and epoxidation. See, Jin, S., Makris, T. M., Bryson, T. A., Sligar, S. G. & Dawson, J. H. Epoxidation of olefins by hydroperoxo-ferric cytochrome P450. *J. Am. Chem. Soc.* 125, 3406-3407 (2003), Borovik, A. S. Role of metal-oxo complexes in the cleavage of C—H bonds. *Chem. Soc. Rev.* 40, 1870-1874 (2011), Banerjee, R., Proshlyakov, Y., Lipscomb, J. D. & Proshlyakov, D. A. Structure of the key species in the enzymatic oxidation of methane to methanol. *Nature* 518, 431-434 (2015), and Vaz, A. D. N., McGinnity, D. F. & Coon, M. J. Epoxidation of olefins by cytochrome P450: Evidence from site-specific mutagenesis for hydroperoxo-iron as an electrophilic oxidant. *Proc. Natl. Acad. Sci.* 95, 3555-3560 (1998), each of which is incorporated by reference in its entirety. Mo(VI)=O is the active species within enzymes that have the ability to selectively oxidize/reduce a target substrate using water as the oxygen source. See, Holm, R. H. Metal-Centered Oxygen Atom Transfer Reactions. *Chem. Rev.* 87, 1401-1449 (1987), Basu, P., Kail, B. W. & Young, C. G. Influence of the Oxygen Atom Acceptor on the Reaction Coordinate and Mechanism of Oxygen Atom Transfer from the Dioxo-Mo(VI) Complex, Tp i PrMoO2(OPh), to Tertiary Phosphines. *Inorg. Chem.* 49, 4895-4900 (2010), and Reddy, P. R., Holm, R. H. & Caradonna, J. P. Kinetics, Mechanisms, and Catalysis of Oxygen Atom Transfer Reactions of S-Oxide and Pyridine N-Oxide Substrates with Molybdenum(IV,VI) Complexes: Relevance to Molybdoenzymes. *J. Am. Chem. Soc.* 110, 2139-2144 (1988), each of which is incorporated by reference in its entirety. Examples include: i) Xanthine oxidase, with the ability to efficiently oxidize xanthine into uric acid, and ii) D-biotin S-oxide reductase, which converts a biologically inactive oxide to a coenzyme sulfide molecules. Furthermore, iron porphyrin based enzymes named cytochrome P450's exclusively utilizes dioxygen to oxidize C—H bonds, or insert an oxygen atom in a variety of substrates, including alkanes to form alcohols, and olefins to form oxides via high valent iron (IV)=O species. Additionally, particulate forms of methane monooxygenase (pMMO) consists of catalytic dicopper centers, where molecular oxygen is captured, and then used by mixed-valent bis-μ-oxo Cu(II)/Cu(III) species to activate the C—H bonds in methane to form methanol. See, Taki, M., Itoh, S. & Fukuzumi, S. Oxo-transfer reaction from a bis(μ-oxo)dicopper(III) complex to sulfides. *J. Am. Chem. Soc.* 124, 998-1002 (2002), which is incorporated by reference in its entirety.

Biological mimicry of natural enzyme active sites is a typical technique that has been extensively studied. In this regard, a wide variety of metal-oxo containing homogeneous complexes have been explored. See, Engelmann, X., Monte-Perez, I. & Ray, K. Oxidation Reactions with Bioinspired Mononuclear Non-Heme Metal-Oxo Complexes. *Angew. Chemie—Int. Ed.* 55, 7632-7649 (2016), Wang, B. et al. Synthesis and reactivity of a mononuclear non-haem cobalt(IV)-oxo complex. *Nat. Commun.* 8, 1-10 (2017), Kim, S. et al. Factors Controlling the Chemoselectivity in the Oxidation of Olefins by Nonheme Manganese(IV)-Oxo Complexes. *J. Am. Chem. Soc.* 138, 10654-10663 (2016), and Cao, Y., Yu, H., Peng, F. & Wang, H. Selective allylic oxidation of cyclohexene catalyzed by nitrogen-doped carbon nanotubes. *ACS Catal.* 4, 1617-1625 (2014), each of which is incorporated by reference in its entirety. However, comparable selectivity and activities to those possessed by biological metal clusters have never been reported by any synthetic catalysts. More importantly, while nature does oxygen atom transfer at ambient pressures and temperatures utilizing both molecular oxygen and water, the implementation of molecular oxygen in synthetic system requires going through a peroxide intermediate which is highly reactive, leading to long-term stability issues. See, Jin, S., Makris, T. M., Bryson, T. A., Sligar, S. G. & Dawson, J. H. Epoxidation of olefins by hydroperoxo-ferric cytochrome P450. *J. Am. Chem. Soc.* 125, 3406-3407 (2003), and Banerjee, R., Proshlyakov, Y., Lipscomb, J. D. & Proshlyakov, D. A. Structure of the key species in the enzymatic oxidation of methane to methanol. *Nature* 518, 431-434 (2015), each of which is incorporated by reference in its entirety. Hence, it would be interesting and beneficial to utilize water as the oxygen source in order to directly activate substrates under ambient conditions.

In this study, the electrochemical generation of an oxide from olefin substrates is described. Epoxides have been pursued as important chemical for the synthesis of various commercial products including surfactant/detergents, epoxy resins, pharmaceuticals. See, Liu, Y. et al. A novel biodegradable polymeric surfactant synthesized from carbon dioxide, maleic anhydride and propylene epoxide. *Polym. Chem.* 6, 2076-2083 (2015), Moon, S. J. & Kang, T. J. Effects of Epoxide and Silicone Polymers on the Mechanical and Performance Properties of Wool Fabric. *Text. Res. J.* 70, 1063-1069 (2000), and Nakajima, H. et al. New antitumor substances, FR901463, FR901464 and FR901465. II. Activities against experimental tumors in mice and mechanism of action. *J. Antibiot.* (*Tokyo*). 49, 1204-1211 (1996), each of which is incorporated by reference in its entirety. Currently, most alkene epoxidation reactions proceed with the extensive use of additional peroxy-acid oxidants, such as meta-chloroperoxybenzoic acid (mCPBA) which inevitably generates undesirable, stoichiometric byproducts. See, Kim, C., Traylor, T. G. & Perrin, C. L. MCPBA epoxidation of alkenes: Reinvestigation of correlation between rate and ionization potential. *J. Am. Chem. Soc.* 120, 9513-9516 (1998), which is incorporated by reference in its entirety. To avoid this, several bioinspired homogeneous catalysts have been suggested that utilize molecular oxygen. Transition metal based polyoxometaltes (POM) were reported as catalysts for epoxidation of various olefin substrates by activation of oxygen or using $H_2O_2$. See, Neumann, R. & Dahan, M. A ruthenium-substituted polyoxometalate as an inorganic dioxygenase for activation of molecular oxygen. *Nature* 388, 353-355 (1997), Hua, L. et al. A Ti-substituted polyoxometalate as a heterogeneous catalyst for olefin epoxidation with aqueous hydrogen peroxide. *New J. Chem.* 35, 1836-1841 (2011), and Jiménez-Lozano, P., Skobelev, I. Y., Kholdeeva, O. A., Poblet, J. M. & Carbó, J. J. Alkene Epoxidation Catalyzed by Ti-Containing Polyoxometalates: Unprecedented β-Oxygen Transfer Mechanism. *Inorg. Chem.* 55, 6080-6084 (2016), each of which is incorporated by reference in its entirety. Recently, iron clusters were embedded in mesoporous carbon nitride and were investigated as well for epoxidation chemistry. See, Tian, S. et al. Carbon nitride supported Fe2 cluster catalysts with superior performance for alkene epoxidation. *Nat. Commun.* 9, 2353 (2018), which is incorporated by reference in its entirety. Although these catalysts exhibit high selectivity and yield, they still require elevated temperatures (80~90° C.) and separation of the catalysts.

In this regard, electrochemical organic synthesis has been regarded as a promising alternative pathway in terms of scalability and recyclability. Many pioneering studies have attempted to activate C—H or —OH bonds in the olefin substrates by redox mediators. For instance, one group was able to selectively activate —OH bonds in alcohol substrate using TEMPO(2,2,6,6-tetramethyl-1-piperidine N-oxyl) redox mediators to form aldehydes. See, Badalyan, A. & Stahl, S. S. Cooperative electrocatalytic alcohol oxidation with electron-proton-transfer mediators. *Nature* 535, 406-410 (2016), Hoover, J. M. & Stahl, S. S. Highly practical copper(I)/TEMPO catalyst system for chemoselective aerobic oxidation of primary alcohols. *J. Am. Chem. Soc.* 133, 16901-16910 (2011), and Hoover, J. M., Ryland, B. L. & Stahl, S. S. Mechanism of copper(I)/TEMPO-catalyzed aerobic alcohol oxidation. *J. Am. Chem. Soc.* 135, 2357-2367 (2013), each of which is incorporated by reference in its entirety. In addition, another group has demonstrated allylic C—H bond oxidation of several substrates using various redox mediators such as NHPI(N-hydroxyphthalimide) and quinuclidine derivatives. See, Horn, E. J. et al. Scalable and sustainable electrochemical allylic C—H oxidation. *Nature* 533, 77-81 (2016), and Kawamata, Y. et al. Scalable, Electrochemical Oxidation of Unactivated C—H Bonds. *J. Am. Chem. Soc.* 139, 7448-7451 (2017), each of which is incorporated by reference in its entirety. The redox mediator involved electrochemical pathway has enabled activation of target substrates at low a potential regime with high selectivity.

The electrochemical oxidation of olefins has been mostly attempted with the combination of electrochemical hydrogen peroxide generation by reduction of molecular oxygen on the cathode and chemical conversion of olefin substrates. See, Nishihara, H., Pressprich, K., Murray, R. W. & Coliman, J. P. Electrochemical Olefin Epoxidation with Manganese meso-Tetraphenylporphyrin Catalyst and Hydrogen Peroxide Generation at Polymer-Coated Electrodes. *Inorg. Chem.* 29, 1000-1006 (1990), and Espinal, L., Suib, S. L. & Rusling, J. F. Electrochemical catalysis of styrene epoxidation with films of $MnO_2$ nanoparticles and $H_2O_2$. *J. Am. Chem. Soc.* 126, 7676-7682 (2004), each of which is incorporated by reference in its entirety. Generated hydrogen peroxide leads to the formation of high valent metal-oxo species in metal porphyrin centers, which sequentially transfer an oxygen atom into the substrates to make the epoxide.

In contrast, a method of electrochemical epoxidation of olefin substrates under ambient pressures and temperatures is described here. Ten nm sized manganese oxide nanoparticles (NPs) are able to successfully catalyze cyclooctene epoxidation with water as an oxygen source. To the best of our knowledge, a scheme has never been reported for the oxidation of olefin substrates using water at ambient conditions. The strong correlation between water-mediated manganese redox behavior and epoxidation was verified and over 40% Faradaic efficiency towards oxidized products including the epoxide and ketone was achieved. From the detailed electrokinetic studies and isotope labeling experiments, it was clearly demonstrated that oxygen in cyclooctene oxide is directly transferred from the water in the electrolyte.

Data and Discussion

Figure 10:
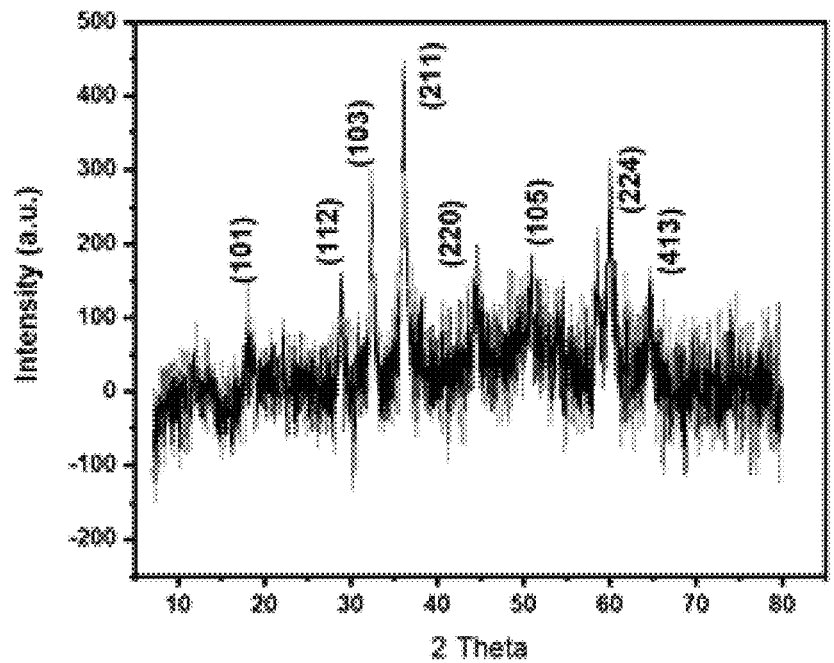
FIG. 10 depicts an X-ray diffraction spectrum.

Ten nanometer sized, monodisperse manganese oxide nanoparticles (NPs) were prepared using a typical hot injection method. A ligand exchange procedure was performed on the NPs to replace hydrophobic myristic acid ligands on the manganese oxide NPs with $NOBF_4$ ligands (see supporting information). Manganese oxide NPs dispersed in ethanol were then drop-cast on hydrophilic carbon paper and subsequently annealed in a muffle furnace at 400° C. for 5 hours. X-ray diffraction (XRD) and scanning electron microscope (SEM) analysis confirmed that $Mn_3O_4$ nanoparticles were uniformly distributed on the carbon paper. (FIG. 3A and FIG. 10)

Electrochemical experiments were conducted by using a one compartment electrochemical cell. A platinum foil and manganese oxide loaded carbon paper were used as the counter and working electrode, respectively. A Ag/AgCl electrode (Innovative Instruments) was used as the reference electrode and aluminum foil was used as the current collector. To determine the catalytic activity of manganese oxide nanoparticles towards cyclooctene activation, cyclic voltammetry (CV) curves were first recorded. Acetonitrile with 0.1M tetrabutylammonium tetrafluoroborate ($TBABF_4$) was used as the solvent with varying concentrations of cyclooctene and water. All the potentials were 85% IR compensated using EIS techniques and were calibrated by measuring ferrocene/ferrocenium redox couple.

Figure 4A:
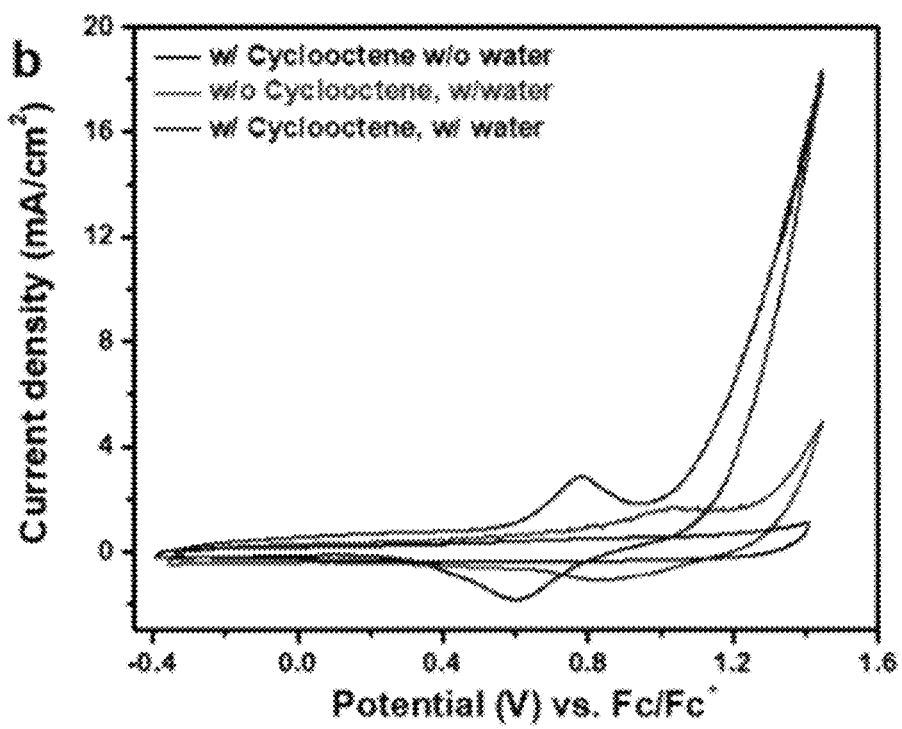
FIG. 4A depicts cyclic voltammetry curves.
Figure 4B:
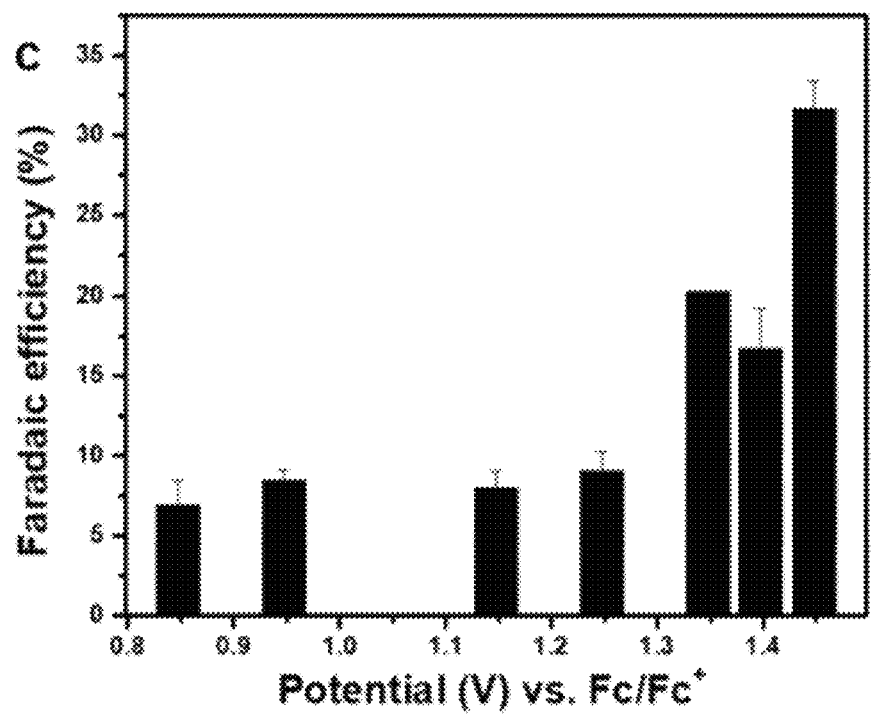
FIG. 4B depicts a graph showing Faradaic efficiency.

Referring to FIG. 3A, TEM images show synthesized 10 nm sized $Mn_3O_4$ nanoparticles. Referring to FIG. 4A, cyclic voltammetry curves are shown for $Mn_3O_4$ nanoparticles varying substrate and water concentration. Referring to FIG. 4B, Faradaic efficiency for epoxide is shown various potentials.

CV curves of $Mn_3O_4$ NPs were compared without water and without cyclooctene to optimized reaction conditions, specifically, 200 mM cyclooctene and 5 M $H_2O$. As displayed in FIG. 4B, distinct redox features of manganese oxide appeared at around 0.8 V and 0.6 V vs. Fc/Fc+. The anodic current began to evolve at around 1.15 V vs. Fc/Fc$^+$. The redox behavior and anodic current only appeared in the presence of water and manganese oxide catalysts, which indicated that manganese redox originates from the added water and is closely related to olefin oxidation. According to the previous electrochemical studies in aqueous media, the observed redox peak likely corresponds to the Mn(III)/Mn (IV) redox couple. To verify this, we performed chronoamperometry analysis at various potentials. All the products were collected and analyzed by NMR and GC-MS and quantified using GC-MS spectra with external standard curves. We were able to detect cyclooctene oxide (epoxide) as a product from 0.8V vs. Fc/Fc$^+$, which is well matched with the Mn redox features. Interestingly, at the lower potentials, we only detected the epoxide as a product without the formation of any ketone, while at higher potentials, both products were detected. The product ratio of ketone and epoxide was approximately 5.43:1 at 1.45V vs. Fc/Fc$^+$.

In order to understand the detailed mechanism of epoxidation, electrokinetic data were collected. Cyclic voltammetry (CV) curves were recorded at varying concentrations of cyclooctene from 10 mM to 200 mM. (FIG. 11) As the concentration of cyclooctene increased, oxidative current slightly increased as well, while Mn redox peak features remained unchanged. The dependence of the current density on the concentration of cyclooctene in solution was ascertained from the chronoamperometry data at 1.45V vs. Fc/Fc$^+$. The order dependence of substrate was obtained by plotting the partial current density for epoxide $J_{epoxide}$ versus concentration of substrate. While there was no clear dependence on total anodic current density, a first order dependence was obtained in the log $J_{epoxide}$ vs log $C_{cyclooctene}$ plot. In addition, we also observed that Faradaic efficiency towards epoxide formation increased as concentration of substrate increased.

Figure 5A:
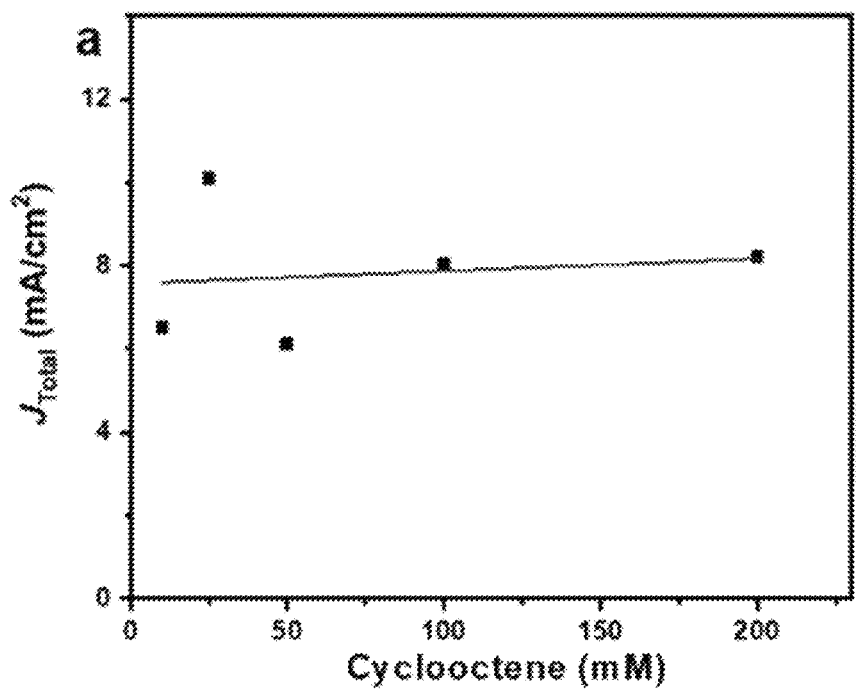
FIG. 5A depicts a graph showing total current density.
Figure 5B:
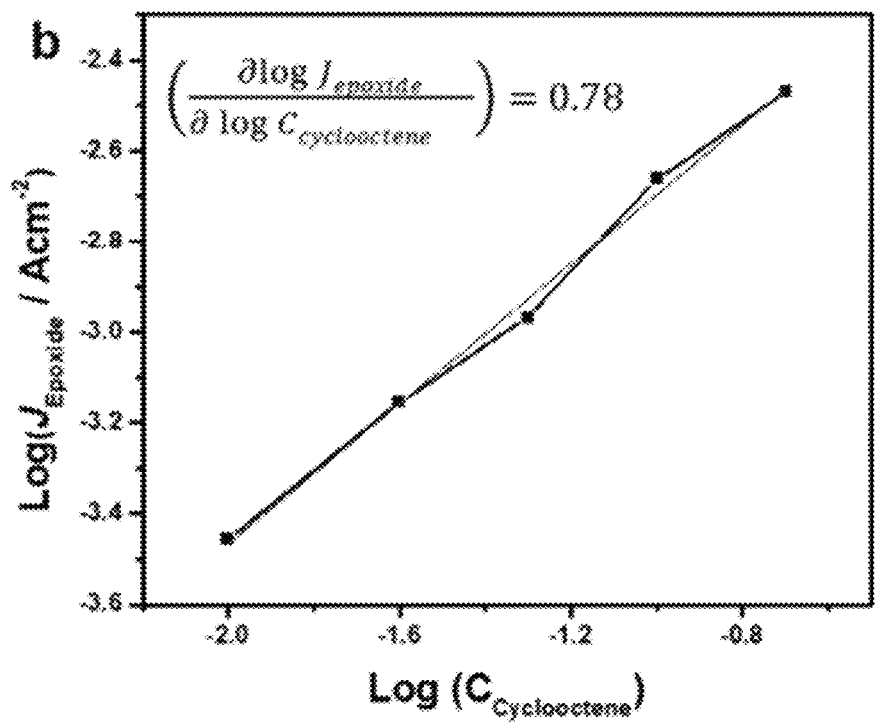
FIG. 5B depicts a graph showing partial current density.

FIGS. 5A-5B show substrate order dependence. Referring to FIG. 5A, total current density values depending on cyclooctene concentration is shown. Referring to FIG. 5B, partial current density versus concentration of substrate is shown. Faradaic efficiency depending on the concentration of substrate is shown in FIG. 3B.

The water dependence of $Mn_3O_4$ NPs was examined by varying the concentration of water from 0.5 M to 15 M. The potential applied to $Mn_3O_4$ NPs was held constant at 1.45 V vs. Fc/Fc$^+$. Measurement of the current density at fixed potential allows for the direct interrogation of the reaction order in $H_2O$ concentration. A plot of the log of the partial current density vs log of water concentration (FIGS. 6A-6C) exhibits linearity from 0.5 M to 5 M and a slope of 0.76, whereas a negative deviation from linearity is observed beyond 5 M concentrations of $H_2O$. At water concentration exceeding the solubility of cyclooctene in solution, the electrolyte becomes slightly turbid and the formation of epoxide is suppressed, resulting in attenuated partial current densities.

Figure 6A:
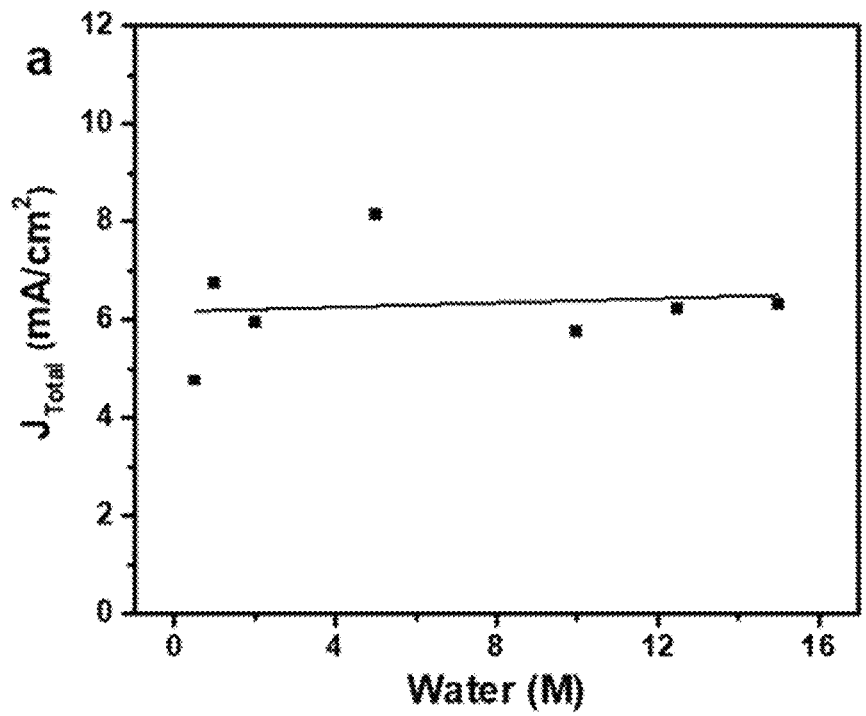
FIG. 6A depicts a graph showing total current density.
Figure 6B:
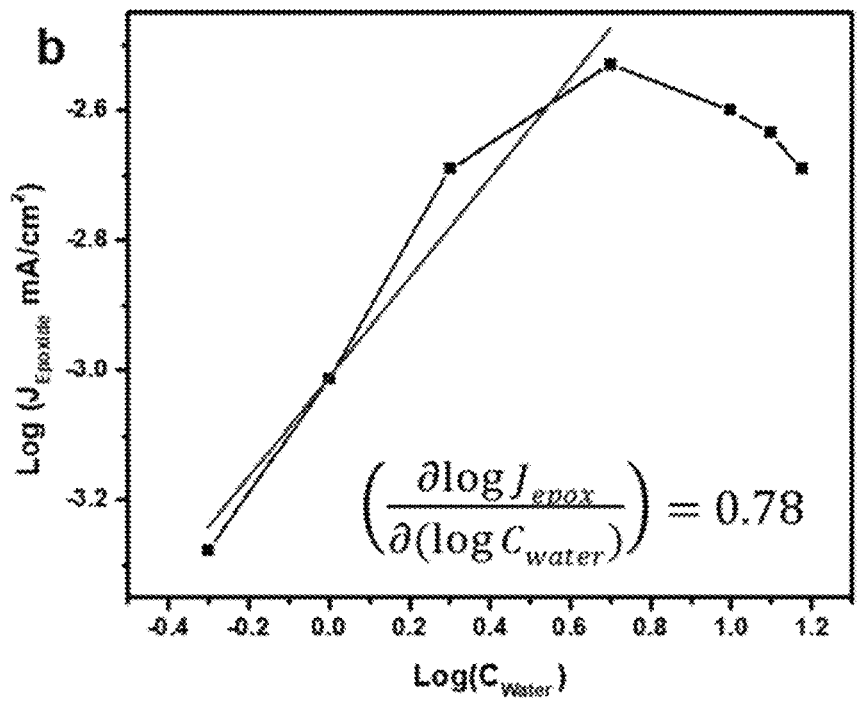
FIG. 6B depicts a graph showing partial current density.
Figure 6C:
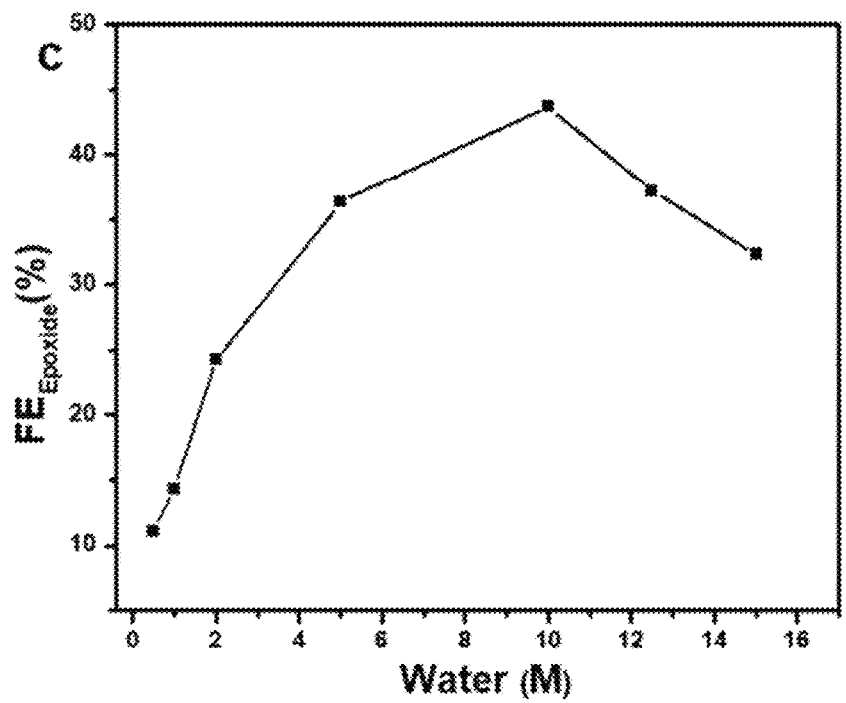
FIG. 6C depicts a graph showing Faradaic efficiency.

FIGS. 6A-6C indicate water order dependence. FIG. 6A shows total current density values depending on water concentration. FIG. 6B shows partial current density versus concentration of water. FIG. 6C shows Faradaic efficiency depending on the concentration of water.

Figure 12:
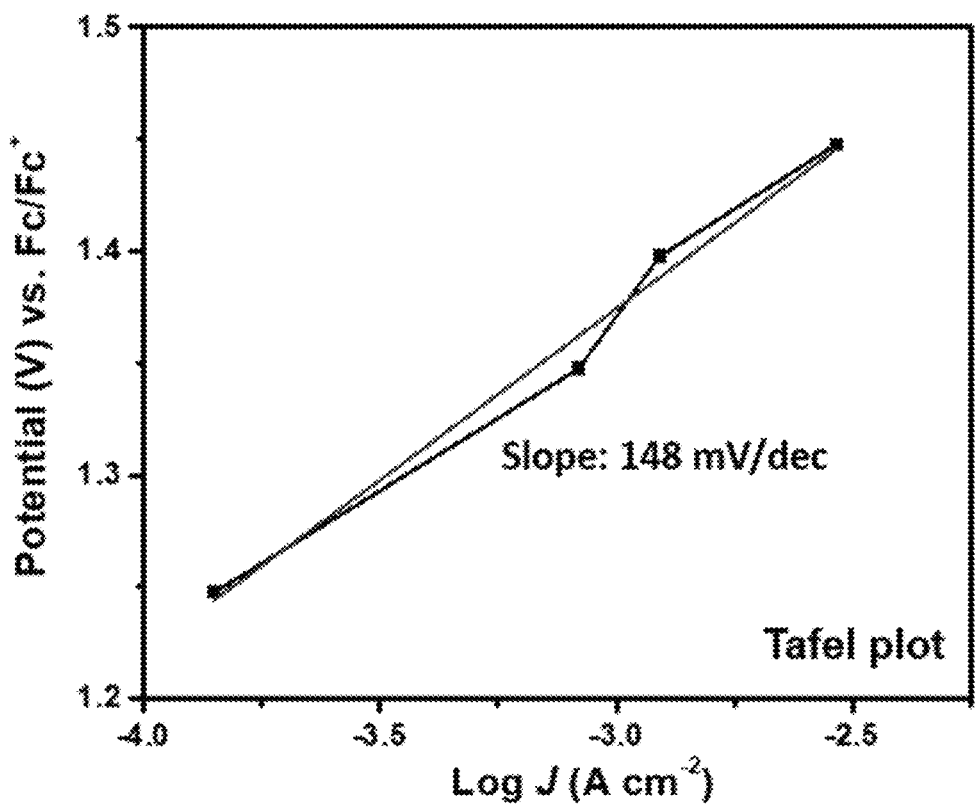
FIG. 12 depicts a Tafel plot.

The current-voltage (Tafel) behavior of the $Mn_3O_4$ NPs in the region of olefin oxidation was measured over a 200 mV range (from 1.25 V to 1.5V vs. Fc/Fc$^+$) in 500 mV increments. The chronoamperometry analysis was conducted at each potential in 5 M $H_2O$ and 200 mM cyclooctene containing ACN electrolyte until total passed charge reached 10 C. As shown in FIG. 12, Tafel slope of $Mn_3O_4$ NPs was 149 mV/dec, which indicates that first electron transfer is the rate determining step (RDS) for the overall epoxidation reaction. Taken together with the electrokinetic data, these results suggest that water and cyclooctene are involved in the first electron transfer RDS.

Figure 7A:
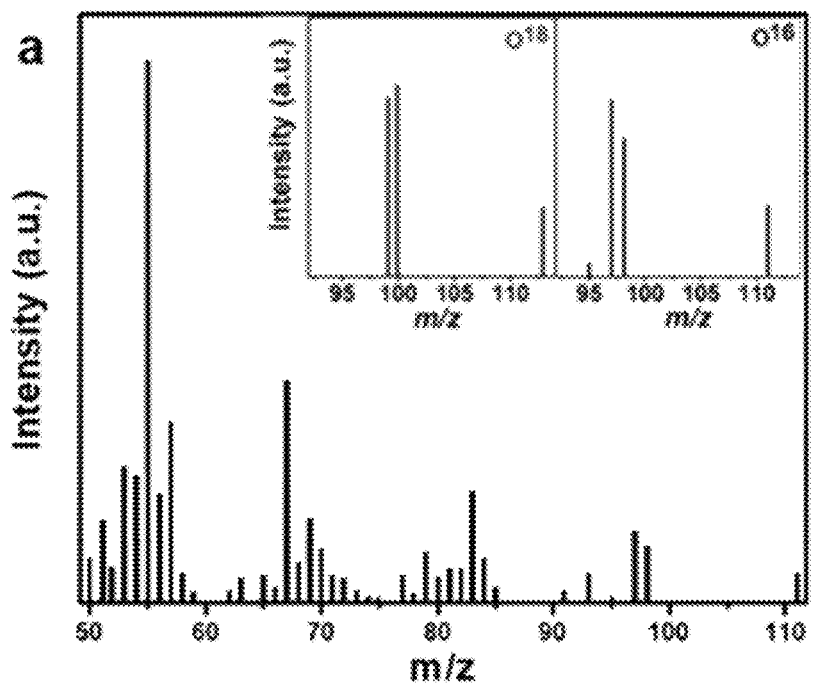
FIG. 7A depicts a graph showing a mass spectrum.

More detailed insights into the nature of the epoxide/ketone formation step is provided from measurements of the isotopic distributions of epoxide/ketone product obtained from the electrolysis with $H_2^{18}O$-enriched electrolyte. FIG. 7A showed electrospray mass spectrum (ESI MS) of synthesized epoxide. It was observed that the prominent ion peaks at a mass-to-charge ratio (m/z) of 97 and 98 were shifted to 99 and 100, respectively when the electrolysis was conducted with a $H_2O^{18}$ oxygen source. The spectroscopic data clearly indicates the oxygen in cyclooctene oxide comes from the added water; this is a unique feature of the electrocatalytic approach described herein, which enables use of water at ambient conditions for epoxidation.

Figure 7B:
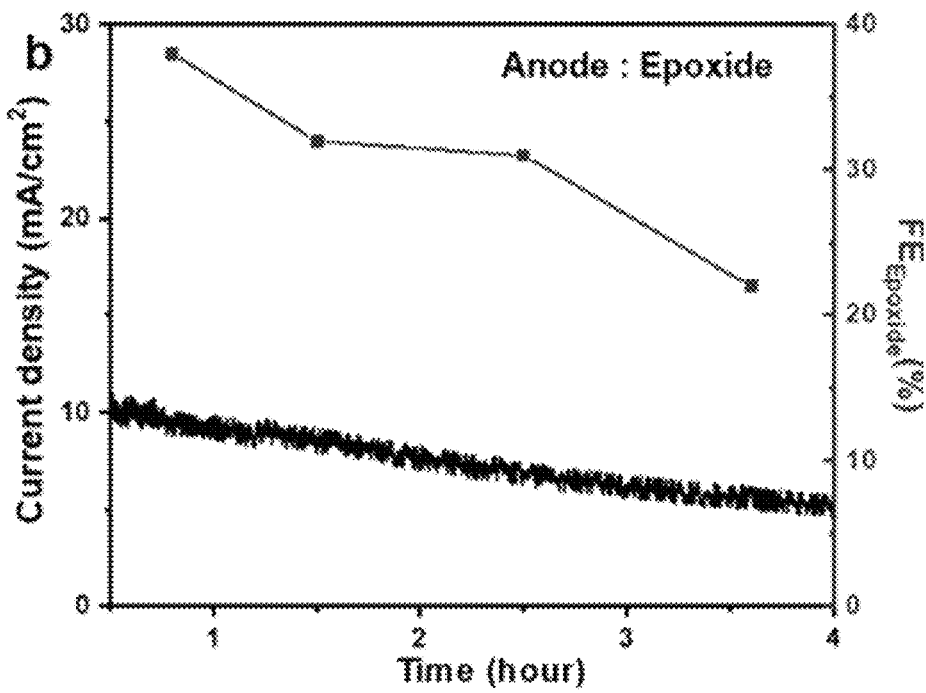
FIG. 7B depicts a graph showing chronoamperometry curves.

To fully understand the overall reaction in the electrochemical cell, the product of the cathode side was checked using gas chromatography. Only hydrogen gas was detected with over a 90% Faradaic efficiency, (FIG. 7C) which implies that our proposed reaction design could be integrated into industrial chemical production. Moreover, long-term electrolysis was conducted to demonstrate sustained chemical production. As shown in FIG. 7B, stable epoxide production was confirmed over a 4-hour electrolysis.

Figure 7C:
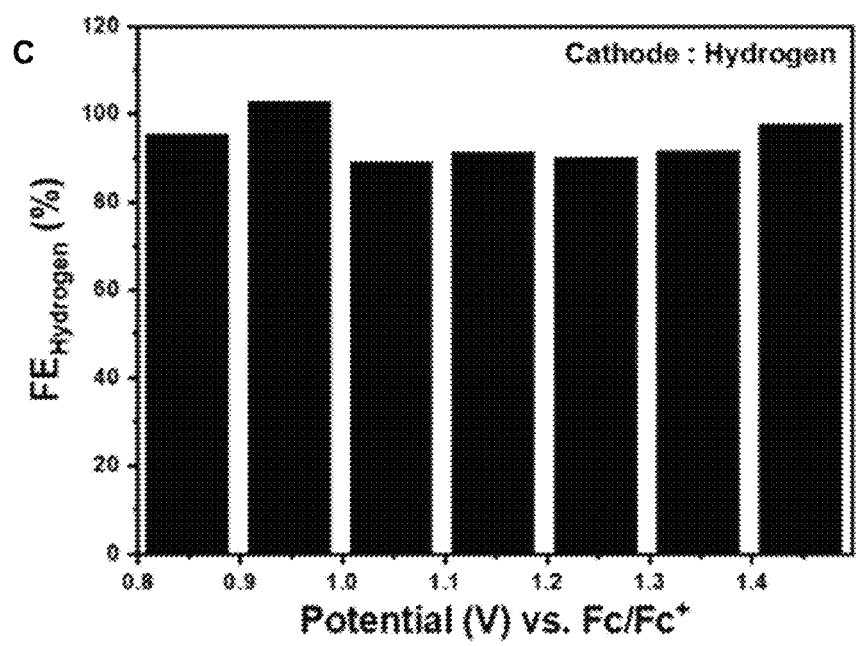
FIG. 7C depicts a graph showing Faradaic efficiency.

Referring to FIGS. 7A-7C, overall reaction and long-term electrolysis was examined. Referring to FIG. 7A, a mass spectrum of the epoxide product generated at the anode was examined. Inset shows clear changes of m/z peaks when using $O^{18}$ labelled water. Referring to FIG. 7B, chronoamperometry curves and $FE_{epoxide}$ of $Mn_3O_4$ at 1.45 V vs. $Fc/Fc^+$ are shown. Referring to FIG. 7C, FE for hydrogen at the cathode is shown.

In conclusion, an electrochemical pathway allows for selective oxidation of cyclooctene substrates, using water as oxygen source. From the electrokinetic study, first reaction order for substrate and for water have been verified and one electron involved rate determining step was suggested. It was reported that over a 35% of Faradaic efficiency towards epoxidation was observed at the anode whereas hydrogen evolution reaction occurs on the cathode with over a 90% of Faradaic efficiency, which indicates that the concept could be utilized to generate valuable chemical feedstock on both electrodes.

EXAMPLES

Materials $MnCl_2\text{-}2H_2O$ (99%), Oleylamine (90%), sulfur (99%), Cyclooctene (95%), Cyclooctene oxide (99%), Cyclooctanone (98%), Tertrabutylammonium tetrafluoroborate ($TBABF_4$) (99%), and Nitrosyl tetrafluoroborate ($NOBF_4$) were purchased from Sigma Aldrich and used without additional treatment. Disk shaped carbon paper electrode with a diameter of 0.5 inches were punched from carbon paper (Toray, TGP-H-060, Fuel Cell Earth LLC).

Catalyst Preparation

MnO Nanoparticle Synthesis

Manganese oxide nanoparticles were synthesized by a hot injection method. Two different mixtures were made separately: one with 1 mmol of manganese(III) acetate and 1 mmol of myristic acid in 20 ml of 1-octadecene, and the other with 3 mmol of 1-decanol in 1 ml of 1-octadecene. The two mixtures were degassed at 110° C. for 2 hours with vigorous stirring. After degassing, the mixture were heated up to 290° C. and 110° C., respectively, under $N_2$ atmosphere. When the temperature of Manganese containing pot was reached to 290° C., the decanol was rapidly injected with vigorous stirring. Then, the reaction mixture was held at 290° C. for 1 hour under $N_2$ atmosphere and, which resulted in the monodisperse manganese oxide NPs.

Alternative methods of synthesis are also possible. Here we describe a second procedure. To prepare 10 nm sized MnO nanoparticles, first step was to make two different mixtures; one with 6 mmol of $MnCl_2\text{-}4H_2O$ and 10 mL of Oleylamine and the other with 2 mmol of elemental sulfur and 5 mL of Oleylamine. These two separate mixtures were degassed at 60° C. for at least 1 hours with vigorous stirring under vacuum. The Mn-Oleylamine mixture was then heated above 150° C. under nitrogen while keeping sulfur solution at 60° C. under nitrogen atmosphere. When it reached to 150° C., the mixture of sulfur was injected rapidly into the Mn containing solution. Reaction mixture was then heated up to 240° C. and aged at 240° C. for 1 hour. The yellowish solution was then cooled to room temperature under air, and we could see the formation of brown layers on the top of yellowish precipitated solution. The brown layers contain the 10 nm sized MnO Nanoparticles. The solution is transferred into the glass vials. Since the melting point of Oleylamine is 21° C., as-synthesized solution should be at 60° C. oven for 30 min prior to purification. Yellowish precipitants (manganese sulfide) are at the bottom and brownish solution (manganese oxide) are placed on top of the precipitants. The brownish solution was used for purification. The 1:1:2 ratio of the synthesized solution (400 μL), ethanol (400 μL), and acetone (800 μL), were mixed and centrifuged (15,500 rpm, 10 min) to obtain MnO precipitates. Then 400 μL of toluene and 800 μL of acetone were added to the precipitates. The mixture was sonicated for 1 min and centrifuged (15,500 rpm, 5 min). After the purification step, 500 μL of hexane was added to re-disperse MnO nanoparticles by sonication. For the size selection, the hexane solution was centrifuged at 10,000 rpm for 10 secs, and supernatant with monodisperse MnO nanoparticles was collected.

Ligand Exchange

To deposit the MnO nanoparticles on the hydrophilic carbon paper, ligand exchange was conducted. As-synthesized MnO NPs were initially dispersed in hexane with concentration of ~1.7 mg/ml. Then, 400 ul of DMF solution of 0.01 M $NOBF_4$ was mixed with 500 μl of MnO NPs solution. The mixed solution was sonicated until the phase transfer occurred. It should be observed that MnO NPs in hydrophobic hexane layer were transferred to hydrophilic DMF. For the purification, centrifugation (13,500 RPM, 5 min) was done with excess amounts of toluene to the solution. The collected nanoparticles were dispersed into 400 uL of ethanol solution.

XRD, SEM, and TEM Analysis

Powder X-ray diffraction (XRD) was carried out on a D-8 Advance X-ray diffractometer with Cu Kα radiation (λ=1.54056 Å) to check the phase of ligand exchanged MnO NPs. For the analysis, first, the precipitated ligand exchanged MnO NPs were dried in 60° C. oven and then annealed at 400° C. for 5 hours, using a muffle furnace. The morphology of the ligand exchanged $Mn_3O_4$ NPs on the hydrophilic carbon paper was characterized with a high resolution scanning electron microscope (Supra 55VP, Carl Zeiss, Germany). Transmission electron microscopy (TEM) images were obtained using a high resolution transmission electron microscope (JEM-2100, JEOL, Japan) with an acceleration voltage of 200 kV. For the analysis, dispered MnO ethanol solution was dropped on the TEM grid and dried in an 60° C. oven before analysis.

Electrochemical Study

Electrochemical Methods

Electrochemical experiments were conducted by using a one compartment electrochemical cell. A platinum foil and manganese oxide loaded carbon paper were used as the counter and working electrode, respectively. A Ag/AgCl electrode (Innovative Instruments) was used as the reference electrode and aluminum foil was used as the current collector. To determine the catalytic activity of manganese oxide nanoparticles towards cyclooctene activation, cyclic voltammetry (CV) curves were first recorded. Acetonitrile with 0.1M tetrabutylammonium tetrafluoroborate ($TBABF_4$) was used as the solvent with varying concentrations of cyclooctene and water. All the potentials were 85% IR compensated using EIS techniques and were calibrated by measuring ferrocene/ferrocenium redox couple.

Prior to each experiment, ACN solution of 0.1M TBAF4 was treated by molecular sieve for at least 12 hours to remove residual water in ACN. For the measurement 4 mL of electrolyte containing specified composition of cyclooctene, water, and buffered ACN was added into the 1-compartment cell. A micro-magnetic spin bar was placed into the cell and stirred. The electrochemical measurements were conducted with VMP3 Multi-channel potentiostat from Biologics.

Electrode Preparation

The punched hydrophobic carbon paper was heated in muffle furnace at 600° C. for 1 hour to make hydrophilic carbon paper. 13 μL of $BF_4$ treated MnO NPs solution was dropped on the hydrophilic carbon paper in 60° C. oven. The MnO droplet was well spread out the entire carbon paper. The drop-casting were repeated for 5 times; 3 drops on the front side and 2 drops on the back side. The electrode was dried in 60° C. oven for 5 min and heated in a muffle furnace at 400° C. for 5 hours.

Product Analysis

All the products generated by electrochemical olefin oxidation were analyzed by Gas chromatography-mass (GC-MS) spectrometry (5977B MSD and 7890B GC, Agilent) and NMR spectrometer (Varian 500 MHz). After each electrolysis we took out 50 μl of electrolyte from the electrochemical cell and diluted it with 950 μl of dichloromethane (DCM). External standards of cyclooctene oxide and cyclooctanone were obtained to quantify the product. The 20 times diluted solution was analyzed by GC-MS. For the NMR analysis, we first took out 630 μl of electrolyte and mix it with 70 μl of deuterated CAN. The NMR spectra were measured on a Varian 500 instrument with solvent suppression.

FIG. 10 shows an X-ray diffraction spectrum of $Mn_3O_4$ Nanoparticles.

Figure 11A:
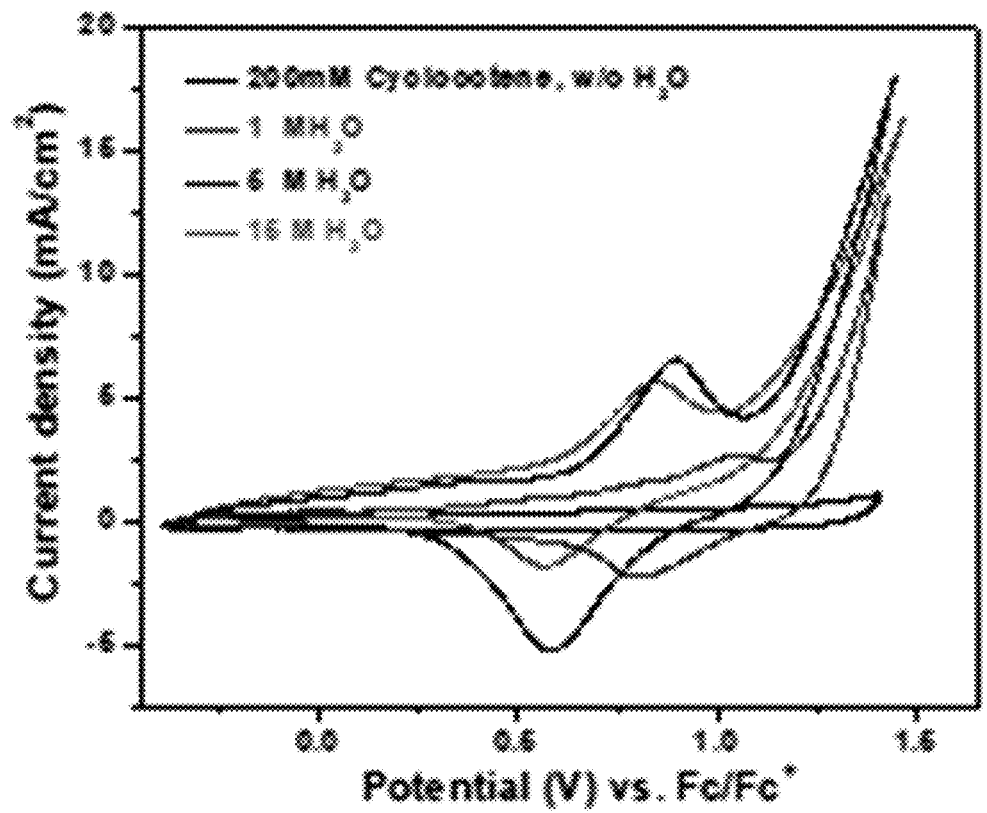
FIGS. 11A and 11B depict cyclic voltammetry curves.
Figure 11B:
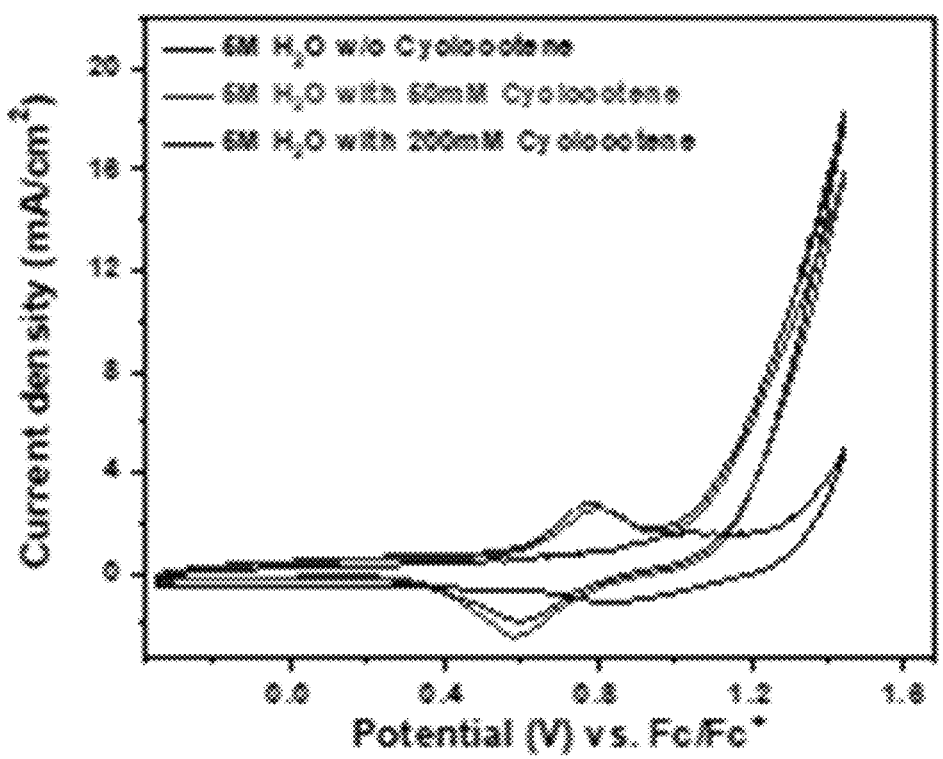

FIGS. 11A and 11B show cyclic voltammetry curves of $Mn_3O_4$ nanoparticles varying water (11A) and cyclooctene (11B) concentration.

FIG. 12 is a Tafel plot of $Mn_3O_4$ nanoparticles with 200 mM cyclooctene and 5M $H_2O$.

Single Atom Catalysts

Figure 14:
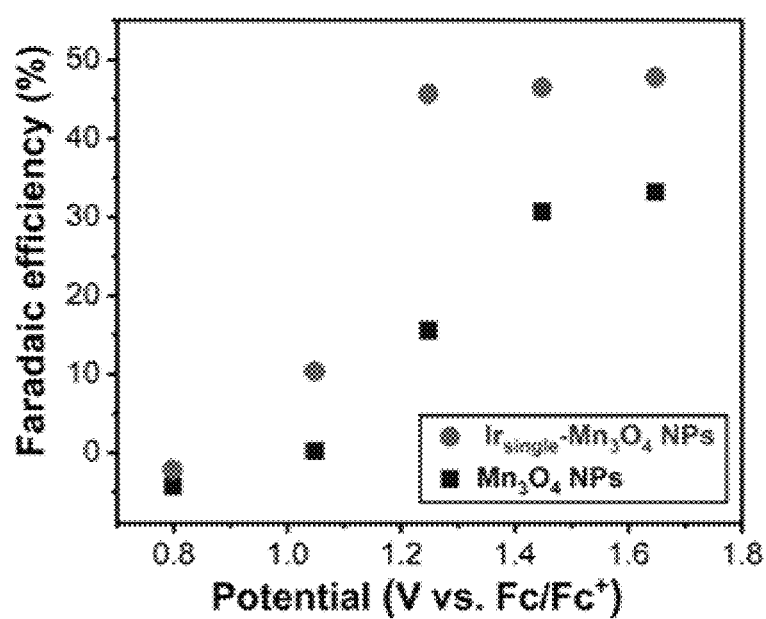
FIG. 14 depicts a graph showing Faradaic efficiency.

Reported above is about 30% of Faradaic efficiency (FE) toward epoxide by using manganese oxide nanoparticles. Other epoxidation catalysts can epoxidize olefin substrates with around 50% FE. The catalysts are single/few atom decorated transition metal oxide nanocatalysts. FIG. 14 shows electrochemical epoxidation data for iridium decorated manganese oxide catalysts.

FIG. 14 shows potential dependent FE for cyclooctene epoxidation. Ir—$Mn_3O_4$ catalysts exhibited higher FE toward epoxide compared to manganese oxide nanoparticles.

Single/few atom decoration was achieved by using a galvanic replacement reaction. The difference in redox potential between the metal in the supporting metal oxide or metal matrix and the active one in the precursor for the single atom decoration induce a spontaneous redox reaction, forming a single/few atom site on a metal oxide/metal nanoparticle. The active metal precursors for galvanic replacement reaction can be a metal chloride. Dispersion from single-atom to few-atom to nanocluster can be controlled by adjusting the concentration of the metal chloride precursor and the temperature of the galvanic replacement reaction. Detailed experiment condition is as follows.

Supporting transition metal oxide/metal matrix can be a Ti, Cr, Mn, Fe, Co, Ni, Cu, or Zn oxide or metal nanoparticle. The size of a nanoparticle can be from 3 nm to 50 nm. A single atom: (Re, Ir, Pt, Ag, Au, Ru, Rh, and Pd)

Brief Description about Galvanic Replacement Procedure:

The 10-15 μL of $BF_4$ treated transition metal oxide nanoparticle solution was dropped on the substrate electrode (carbon paper, fluorine doped tin oxide (FTO), indium doped tin oxide, glassy carbon, stainless steel) in 80° C. oven. The transition metal oxide droplet was well spread out the entire electrode surface. To make single/few atom decorated manganese oxide nanoparticles, 100-1,000 μM of metal chloride precursors was prepared in the deionized water. The transition metal oxide nanoparticle loaded electrodes were then immersed in the metal chloride containing solution and a magnetic bar was placed at the bottom of the beaker. Next, the solution was heated to 40° C.-80° C. with stirring and aged for 1 h-24 hours. Then, single/few atom decorated transition metal oxide loaded electrode was gently rinsed with deionized water and dried in chemical oven. The electrode was transferred to a muffle furnace. Ramp rates for a furnace was set to be 5° C./min from room temperature to 150° C. and the electrode was aged for 1 hour at 150° C.

Gas Phase Epoxidation Reaction

Figure 15A:
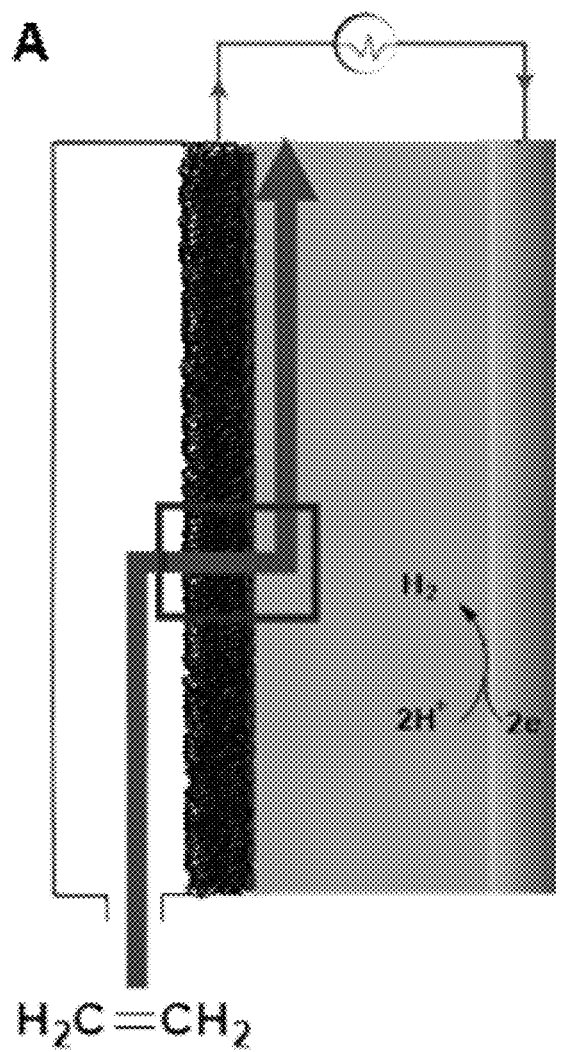
FIGS. 15A-15C depict a cell configuration (FIG. 15A), half-reactions (FIG. 15B) and a graph showing Faradaic efficiency (FIG. 15C).
Figure 15B:
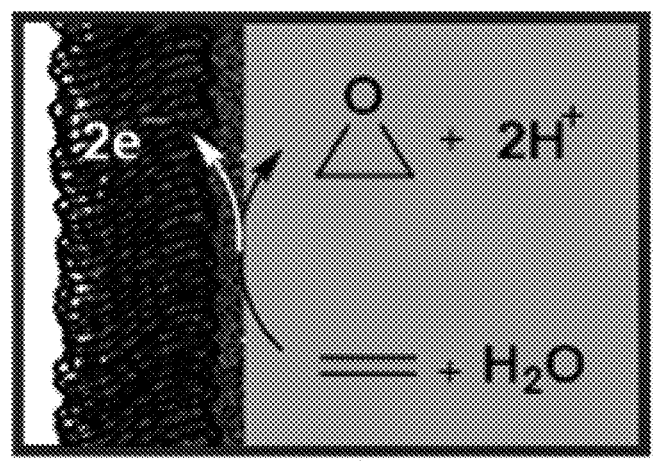
Figure 15C:
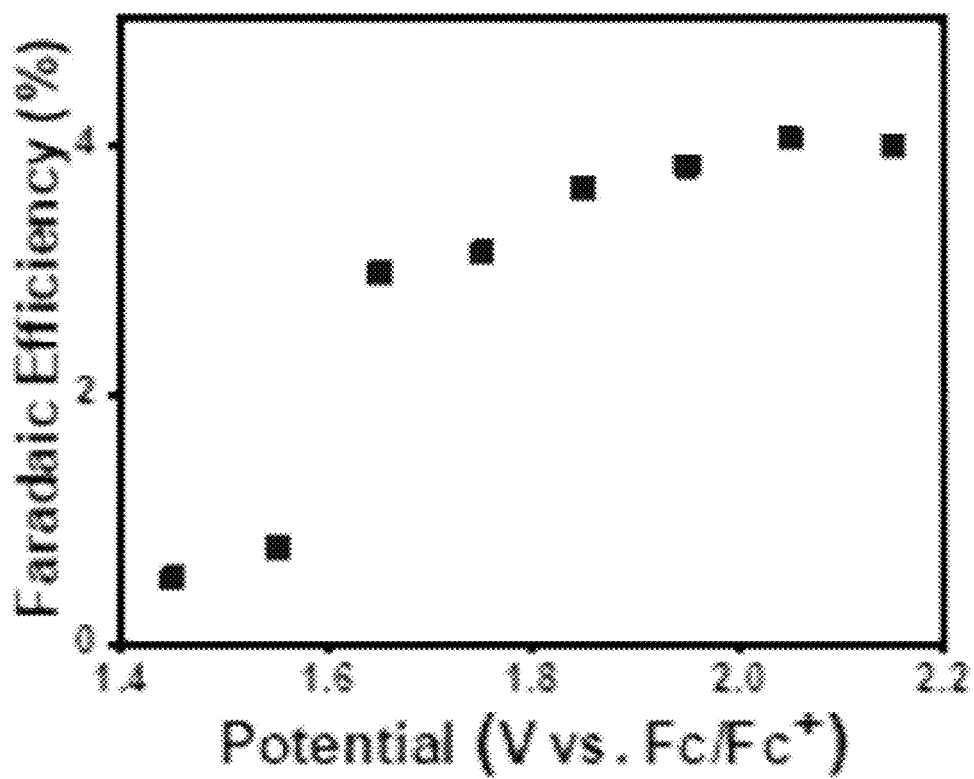

Building on our work on epoxidation of liquid phase olefins, the epoxidation of gas phase olefins was demonstrated. FIGS. 15A-15B shows the cell configuration for gas phase epoxidation (FIG. 15A), with a more detailed view of the reaction at the anode (FIG. 15B). The gas of 5-20 standard cubic centimeters per minute continuously flows through the porous carbon-based anode where metal oxide catalysts are drop-casted. FE for epoxidation of ethylene was around 4% (FIG. 15C).

Brief Description about Gas Phase Epoxidation Reaction:

The electrode preparation procedure was identical with the one for liquid olefin epoxidation. Manganese oxide nanoparticles were prepared on working electrode and water was used as an oxygen source. To feed ethylene gas to the working electrode, we adopted a gas diffusion electrode. High-purity ethylene gas was controlled by mass flow regulator and introduced into the electrochemical cell. Ethylene gas enters the cell through the gas compartment, and passes through the manganese oxide loaded electrode during epoxidation reaction.

FIG. 15A is a schematic diagram depicting a cell configuration for gas phase epoxidation reaction. FIG. 15B is a schematic showing ethylene oxidation half-reaction on anode surface. FIG. 15C is a graph showing potential dependent FE for ethylene epoxidation.

Electrochemical Lactone Formation

Figure 16:
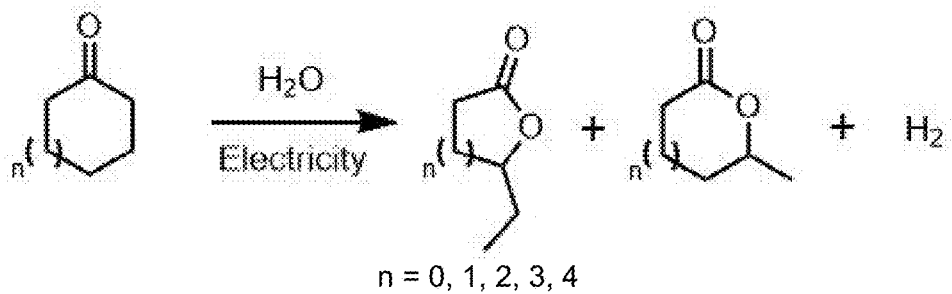
FIG. 16 depicts a schematic showing oxidation of a ketone.

FIG. 16 shows an overall reaction for electrochemical lactone formation.

Using water as an oxygen atom source, we were able to electrochemically oxidize ketones into various lactone products. Table 1 demonstrates different cyclic, unsubstituted ketones and the corresponding electrochemically generated lactones. Discussions from hereforth will use cyclohexanone as the substrate, although similar statements can be made about other ketone substrates, as alluded to by Table 1. For the case of cyclohexanone, two lactone products are formed, gamma-Caprolactone and delta-Hexanolactone.

| Substrate | Products | |
|---|---|---|
| cyclopentanone | γ-butyrolactone-like | γ-methyl lactone |
| cyclohexanone | γ-butyrolactone derivative | δ-methyl lactone |
| cycloheptanone | γ-propyl lactone | δ-ethyl lactone |

Table 1. Small selection of starting ketone substrates and their corresponding electrochemically generated lactones.

Brief Description about Electrochemical Lactone Formation

Figure 17:
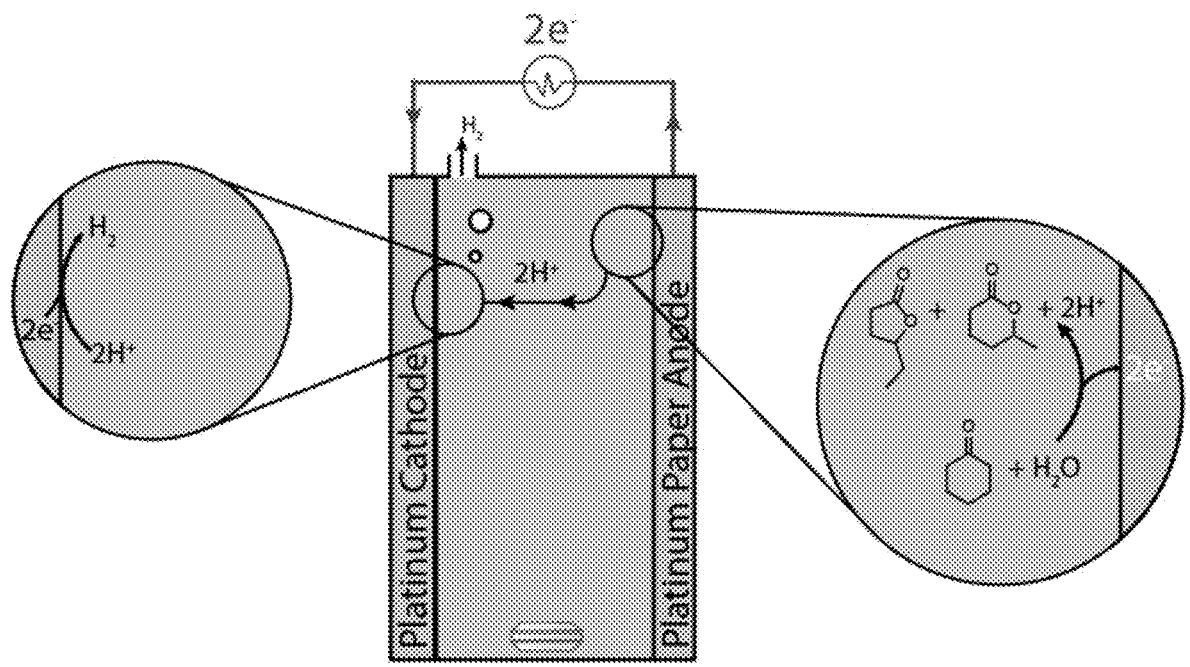
FIG. 17 depict a cell configuration showing ketone oxidation.
Figure 18A:
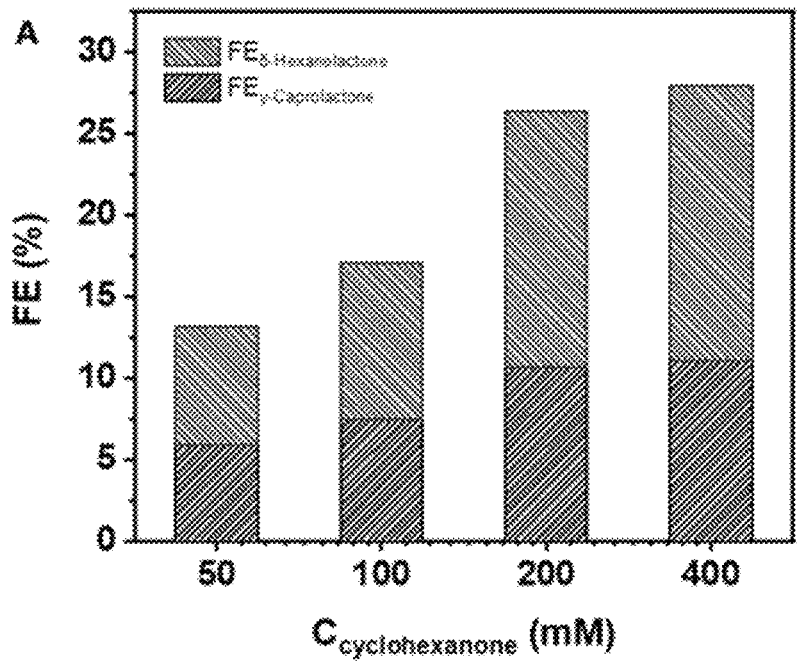
FIGS. 18A-18B depict graphs showing Faradaic efficiency.
Figure 18B:
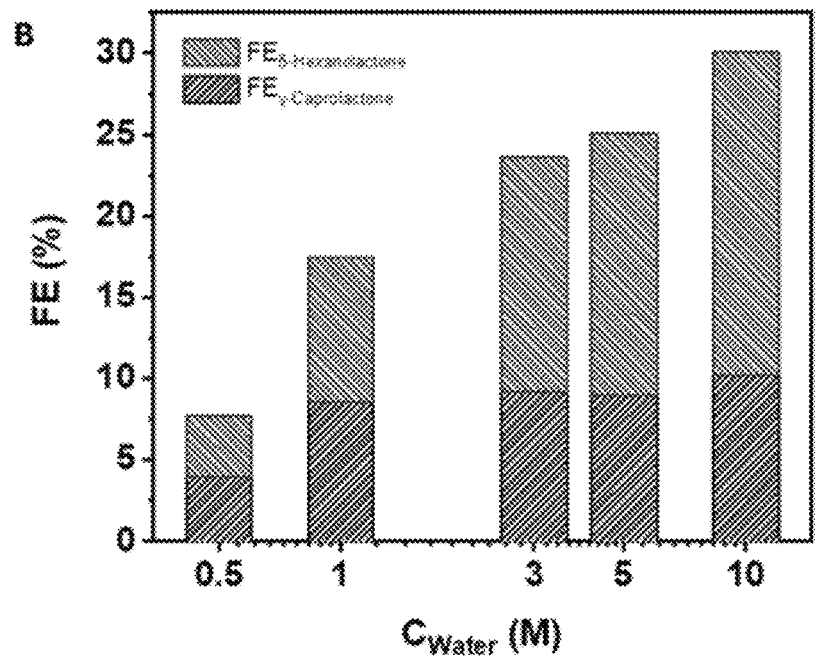

A scheme depicting a typical electrochemical cell set up is shown in FIG. 17. FIG. 17 shows a general set up of an electrochemical cell that can generate lactones from ketones using water. Platinum foil was used as both the anode and cathode material. Lactones and protons are generated at the anode. The protons are then reduced at the cathode to generate Hydrogen gas. Platinum based catalysts were typically employed, specifically Platinum foil anodes, although other platinum based materials such as Pt nanoparticles also sufficed. Platinum foil was also used as the cathode material. Lactone products were typically observed above applied potentials corresponding to 2.0 V vs Ferrocene. For a typical experiment, water, cyclohexanone were mixed in varying concentrations with acetonitrile, using tetrabutylammonium tetrafluoroborate as an electrolyte. We demonstrated that we were able to generate lactones as a product in Faradaic efficiencies greater than 20% and current densities over 25 mA. Varying water and substrate concentration and operating in galvanostatic conditions while applying a constant current of 25 mA, Faradaic efficiencies of up to 30% were observed (FIG. 18). FIGS. 18A-18B are graphs showing Faradaic efficiencies after varying the water and cyclohexanone concentration.

Figure 19A:
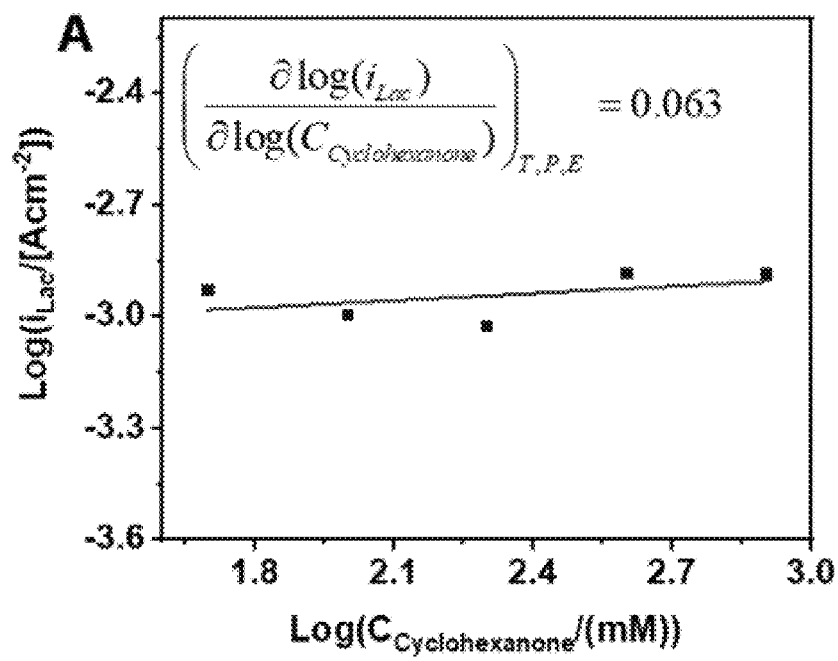
FIGS. 19A-19B depict graphs showing electrokinetic data.
Figure 19B:
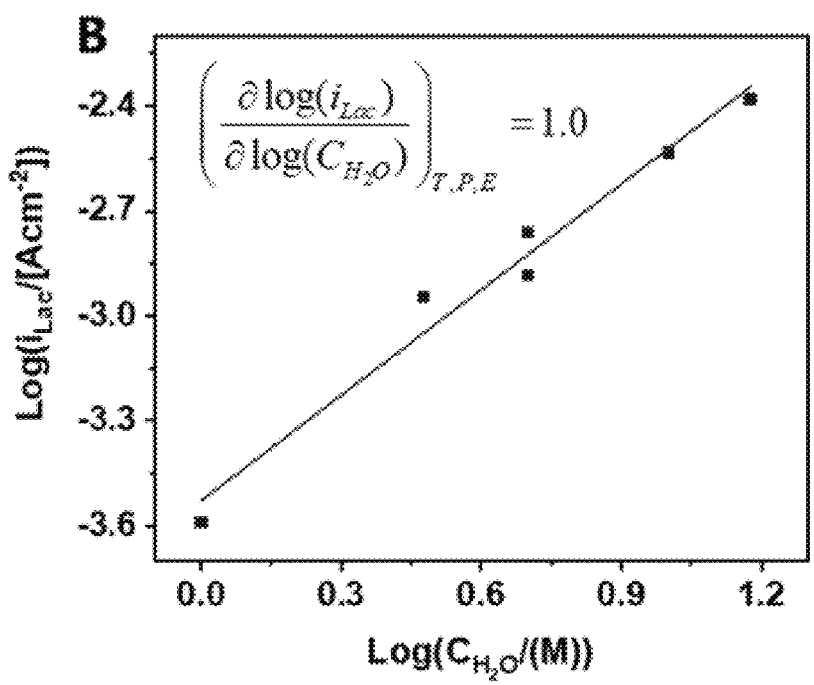

A 25 mA current was applied for 1 hour. For FIG. 18A, 3 M Water was used. For FIG. 18B, 200 mM Cyclohexanone was used. For the case of cyclohexanone, varying the water concentration and substrate concentration give an overall water order dependence of 1.0 and a cyclohexanone order dependence of 0. The Faradaic efficiency toward lactone formation was approximately invariant with changing water or substrate concentration, with the main change being the total current when the water concentration was varied. FIGS. 19A-19B are graphs depicting electrokinetic data for cyclohexanone. For FIG. 19A, the water concentration was held constant at 10 M. For FIG. 19B, the cyclohexanone concentration was held constant at 200 mM. In both cases 50 C of charge were passed.

Figure 20A:
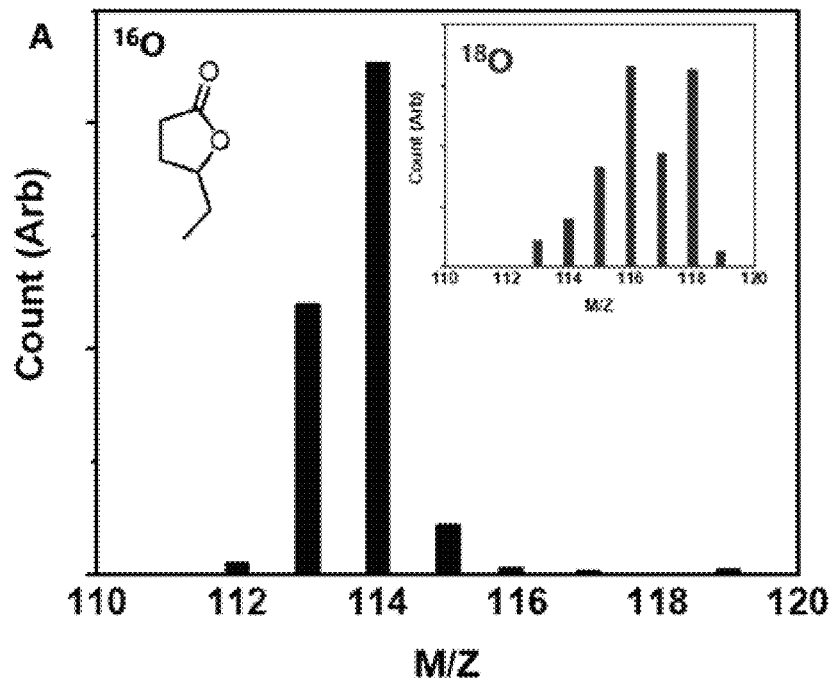
FIGS. 20A-20B depict graphs showing mass spectral data.
Figure 20B:
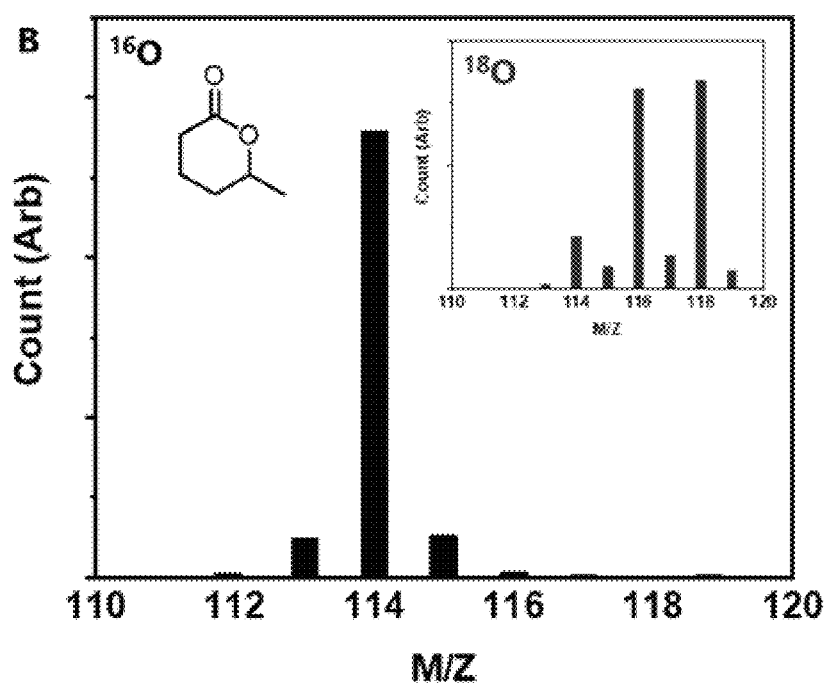

To verify the source of the inserted oxygen atom, labeled $^{18}OH_2$ was using the reaction. FIGS. 20A-20B depict isotope labeling data. Peaks shifts from M/Z=114 are clearly visible in the case where labelled $^{18}O$ is used (M/Z=116 and 118). Upon analysis with a GCMS, we observed shifts in the molecule weight of the product of +2 and +4 (FIGS. 20A-20B). This was explained by the chemical exchange of the O in the ketone of the starting substrate with $^{18}OH_2$ to produce a carbonyl with an $^{18}O$ atom, as is previously reported. The exchange does not go to completion and an equilibrium distribution exists between both, explaining the MW+2 and MW+4 products.

Figure 21A:
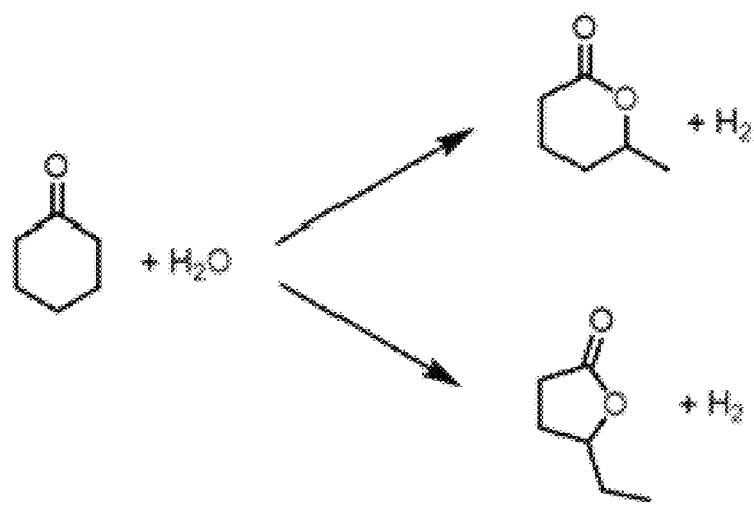
FIGS. 21A-21B depict graphs showing a scheme and a graph showing Faradaic efficiency.
Figure 21B:
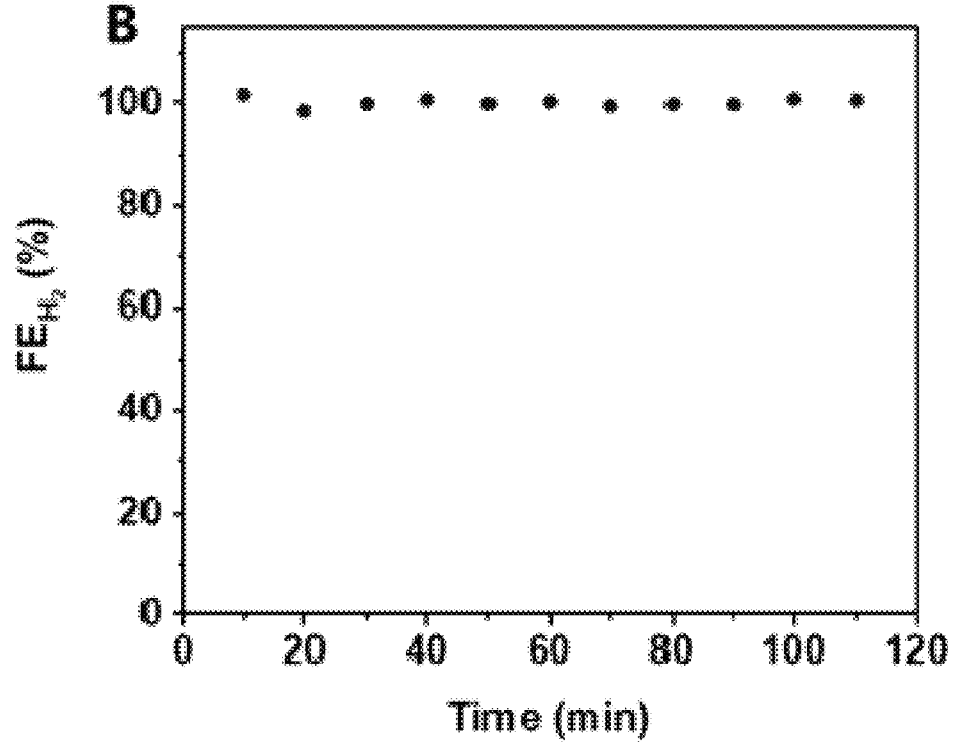

FIG. 21A depicts a proposed overall electrochemical reaction starting from a ketone and using water. FIG. 21B depicts quantification of effluent gas from electrochemical cell. 15 sccm of $N_2$ was used as a carrier gas to bring the effluent gas to a gas chromatograph. Flowing the effluent gas of our electrochemical cell into a GC allowed us to quantify and gaseous products. We observed that the cathode produced hydrogen gas corresponding to a near 100% FE (FIG. 21B). This allowed us to asserts that the overall transformations that are occurring can be described by FIG. 21A.

In addition, our approach described here can be further improved and generalized to other liquid phase ketone containing substrates. We believe selectivity and Faradaic efficiency toward lactones can be enhanced via catalyst design and electrode engineering.

Electrochemical Ketone Formation from Olefin Substrates

Figure 22:
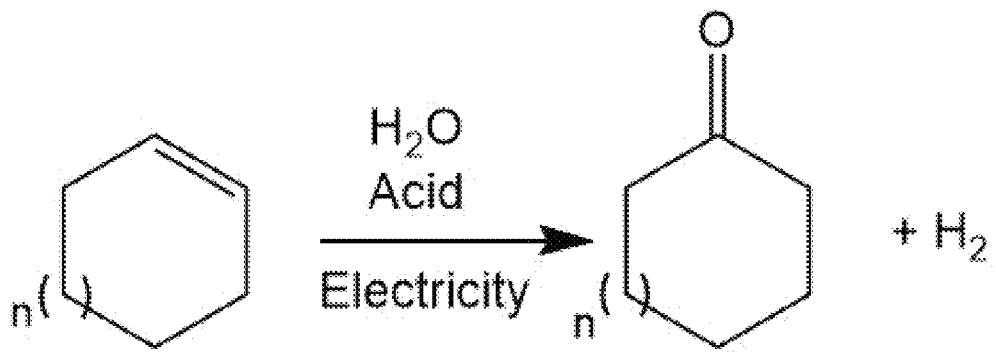
FIG. 22 depicts a schematic showing oxidation of an olefin.
Figure 23A:
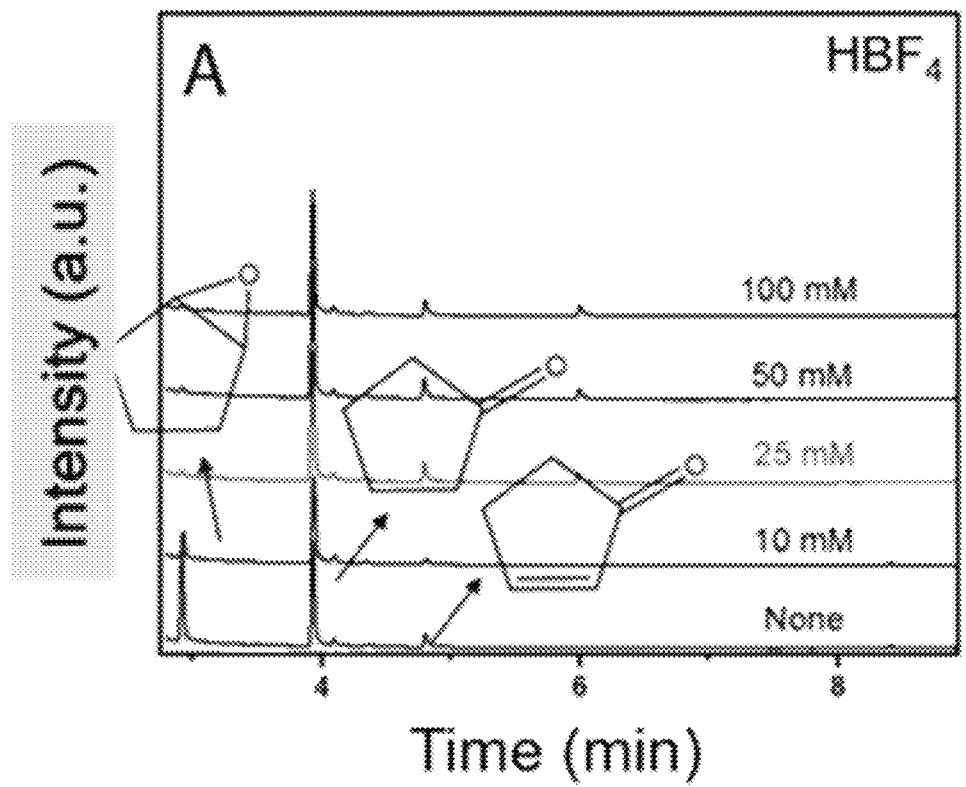
FIG. 23A depicts a graph showing GC-MS spectra.

FIG. 22 depicts an overall reaction scheme for ketone formation. We recently demonstrated that using water as an oxygen atom source, we were able to electrochemical oxidize olefin substrates into corresponding ketone products (FIG. 22). We discovered that when an acid such as $HBF_4$ is added to the standard conditions used to generate the epoxide (as described in the original filing), ketone is selectively formed with 30% Faradaic efficiency, while epoxide formation was suppressed. FIG. 23A shows acid effects on the selectivity. We used cyclopentene as model substrate and found that similar trends were found in other linear or cyclic olefin substrates.

Figure 23B:
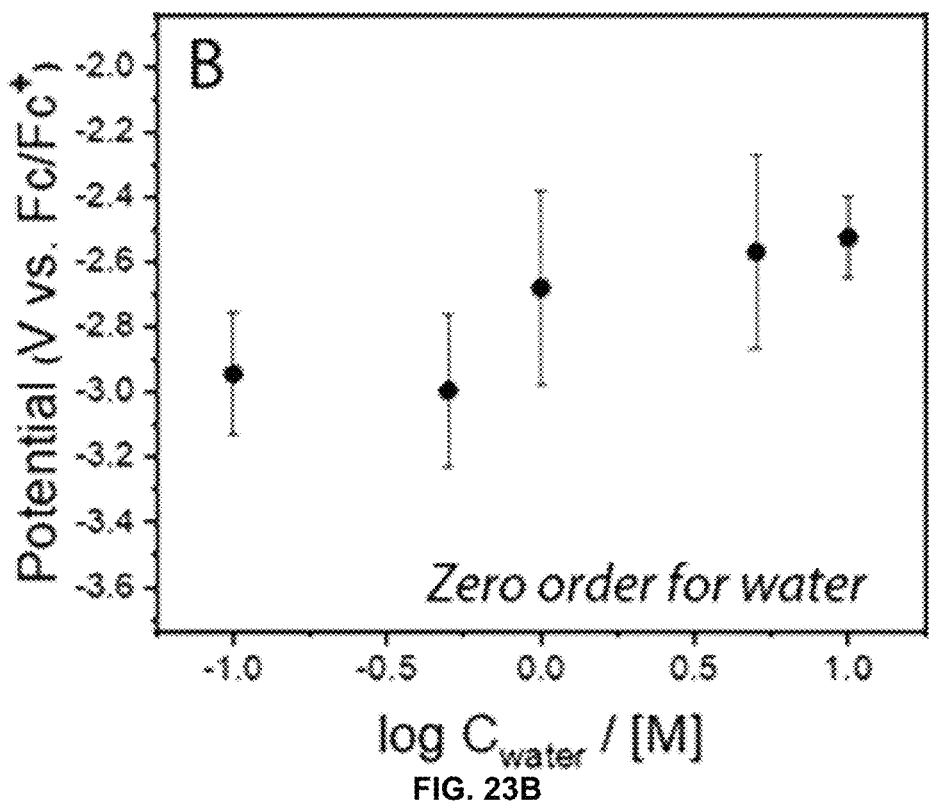
FIGS. 23B-23D depict graphs showing electrokinetic studies.
Figure 23C:
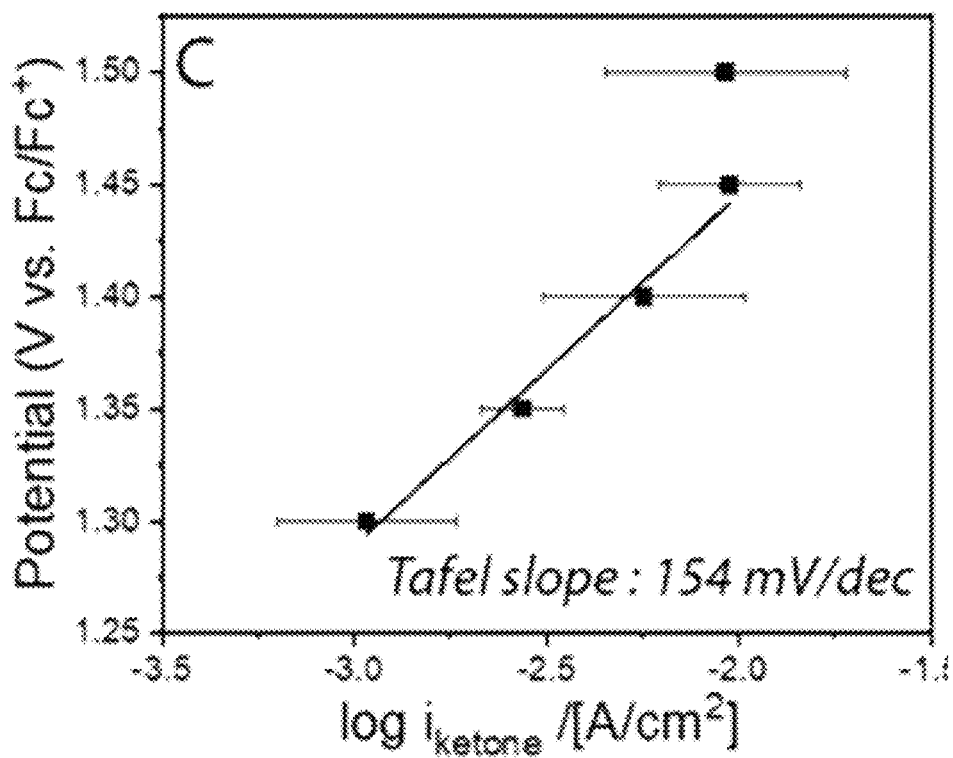
Figure 23D:
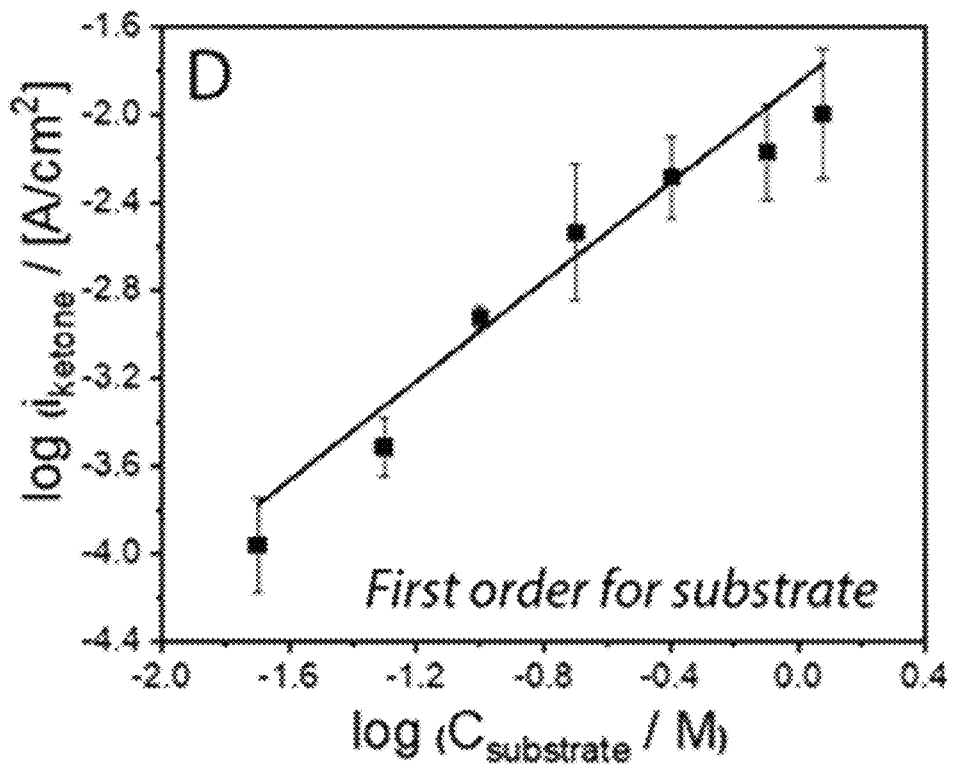

FIG. 23A is a graph showing acid concentration dependence GC-MS spectra of electrolyte solution at 1.45 V vs Fc/Fc$^+$ with 5M $H_2O$ and 200 mM of cyclopentene substrate. FIGS. 23B-23D are graphs depicting electrokinetic studies. (B) Water concentration (at 200 mM cyclopentene) dependence and (C) cyclopentene concentration (5M $H_2O$) dependences of ketone partial current. (D) Tafel plot for ketone formation with 5M $H_2O$ and 200 mM cyclopentene.

Figure 24:
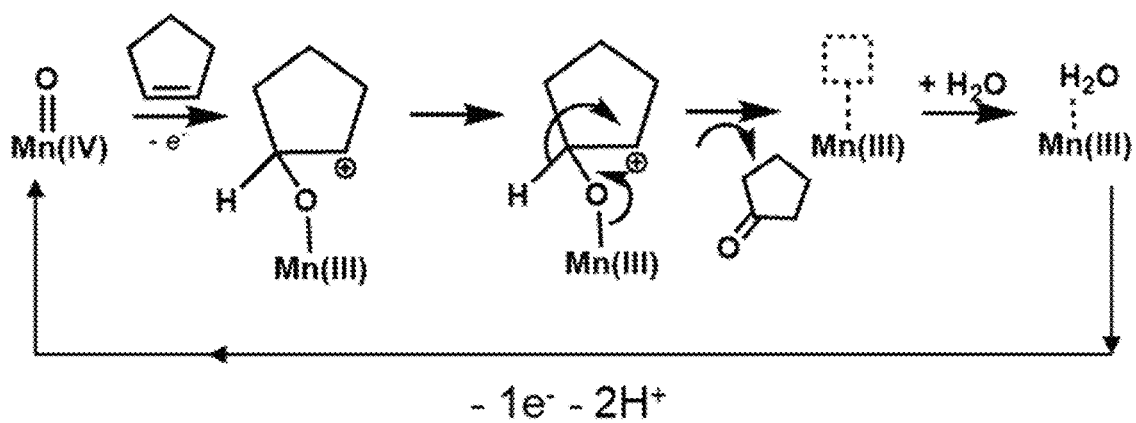
FIG. 24 depicts a scheme ketone formation.

FIG. 24 depicts a scheme showing a proposed mechanism for ketone formation by manganese oxide nanoparticles. In addition, we have conducted electrokinetic studies to understand the mechanism of electrochemical ketone formation. The dependence of the partial current density on the concentration of cyclopentene and water was ascertained from chronoamperometry measurements at 1.45 V vs Fc/Fc$^+$. As a result, while no clear dependence on water concentration, first order dependence was obtained from the log($i_{ketone}$) vs log ($C_{substrate}$). The Tafel slope is 154 mV/dec, which suggests that the rate determining step contains an electron transfer. Based on the electrokinetic studies, we suggest the mechanism in FIG. 24.

Brief Description about Electrochemical Ketone Formation

The 10-15 μL of $BF_4$ treated transition metal oxide nanoparticle solution was dropped on the substrate electrode (carbon paper, fluorine doped tin oxide (FTO), indium doped tin oxide, glassy carbon, stainless steel) in 80° C. oven. The transition metal oxide droplet was well spread out on the entire electrode surface. The electrode was transferred to a muffle furnace. Ramp rates for the furnace was set to be 5° C./min from room temperature to 400° C. and the electrode was aged for 5 hour at 400° C. For electrochemical ketone formation, one-compartment electrochemical cell was used. Pt plate and Ag/AgCl electrodes were used as counter and reference electrode, respectively.

Electrochemical Alkane Partial Oxidation

Figure 25:
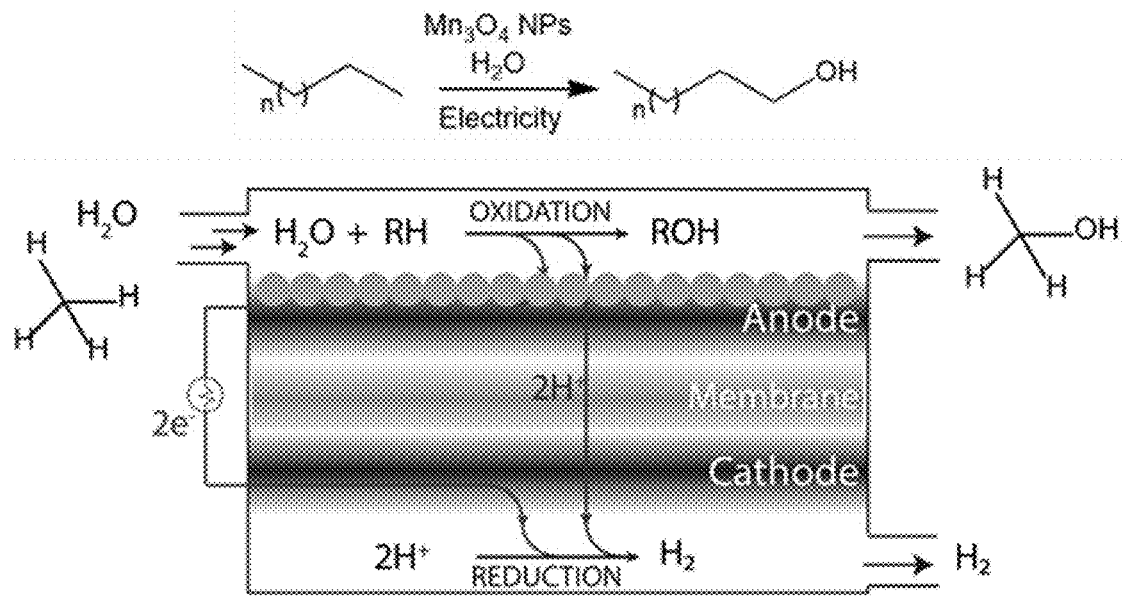
FIG. 25 depicts an electrochemical cell.

FIG. 25 depicts a general set up of an electrochemical cell that can generate alcohols from alkanes using water. Manganese oxide nanoparticles loaded carbon paper and platinum foil was used as the anode and cathode material, respectively. Alcohols and protons are generated at the anode. The protons are then reduced at the cathode to generate Hydrogen gas.

Figure 26:
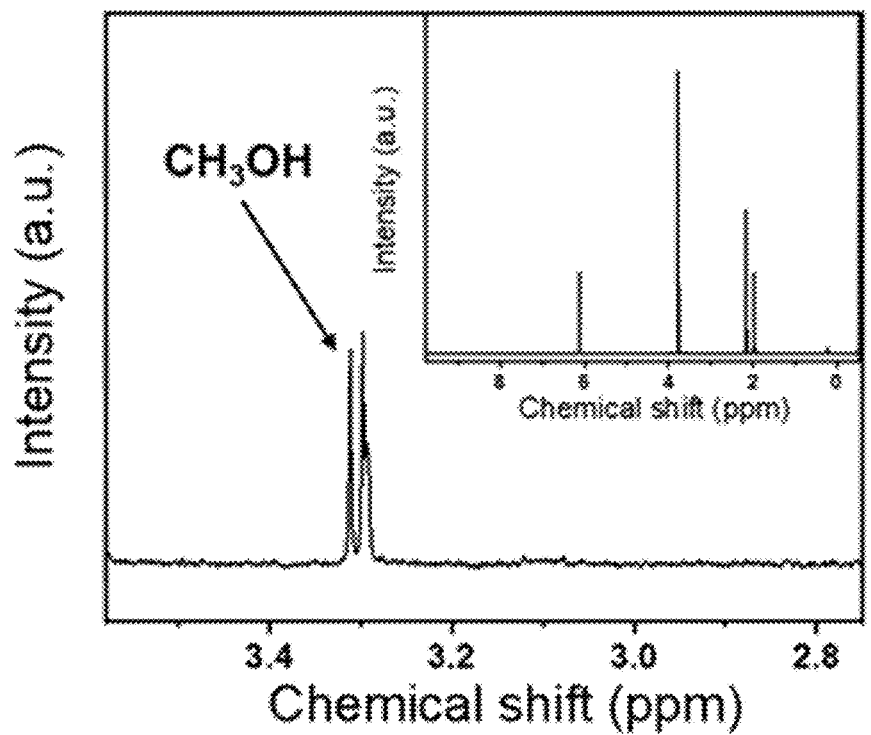
FIG. 26 depicts NMR spectra.

Building on the previously described work on oxygen atom transfer reactions, we demonstrated that using water as an oxygen atom source, we were able to electrochemical oxidize alkane substrates into alcohol products. FIG. 25 shows our reaction scheme and general electrochemical cell set up. We discovered that manganese oxide nanoparticles was able to catalyze methane partial oxidation to methanol with around 5% FE (%). FIG. 26 shows NMR spectra which verified the existence of methanol in electrolyte solution after electrolysis. In particular, FIG. 26 shows NMR spectra of electrolyte solution. The peak at 3.3 ppm is corresponds to methyl group in methanol product. The inset figure shows a full NMR spectra.

Brief Description about Electrochemical Alkane Oxidation

The 10-15 μL of $BF_4$ treated transition metal oxide nanoparticle solution was dropped on the substrate electrode (carbon paper, fluorine doped tin oxide(FTO), indium doped tin oxide, glassy carbon, stainless steel) in 80° C. oven. The transition metal oxide droplet was well spread out the entire electrode surface. The electrode was transferred to a muffle furnace. Ramp rates for a furnace was set to be 5° C./min from room temperature to 400° C. and the electrode was aged for 5 hour at 400° C. For electrochemical alkane oxidation, three-compartment electrochemical cell was used. Nafion was used as membrane and Pt plate and Ag/AgCl electrodes were used as counter and reference electrode, respectively. High purity methane gas was controlled by Alicat mass flow controller and fed into the cell at atmospheric pressure, which contains mixed electrolytes (acetonitrile+water) of the type described in the original filing. Methane gas enters the cell through the gas compartment, traverses the manganese oxide loaded working electrodes, and then goes into acetonitrile containing bubbler to trap vaporized methanol.

Electrochemical C—H Oxidation of Benzylic Substrates

Figure 27:
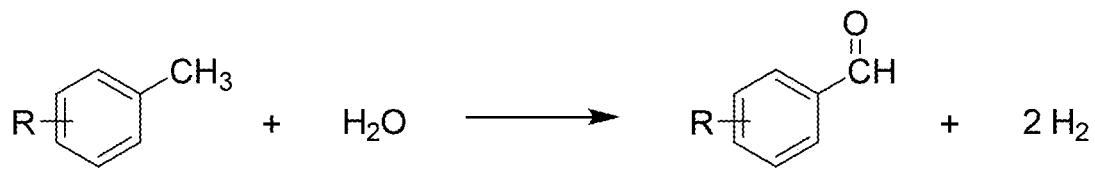
FIG. 27 depicts a scheme showing oxidation of a benzylic substrate.

An additional aspect developed as a part of the O-atom transfer reaction toolkit described here is a class of oxidation reactions involving benzylic C—H bond activation. We have been able to electrochemically oxidize benzylic substrates to the corresponding aldehyde, as described in FIG. 27. As a demonstration of the general features of this reaction scheme, we present here data on the substrate p-xylene. FIG. 27 depicts a generalized overall reaction of benzylic substrate with water to yield the corresponding aldehyde and hydrogen gas. The reaction is not limited to benzylic C—H bonds, but can also be applied to C—H bonds found in saturated and unsaturated hydrocarbons, such as methane, ethane, propane, etc.

Brief Description of Electrochemical Benzylic C—H Activation

Figure 28:
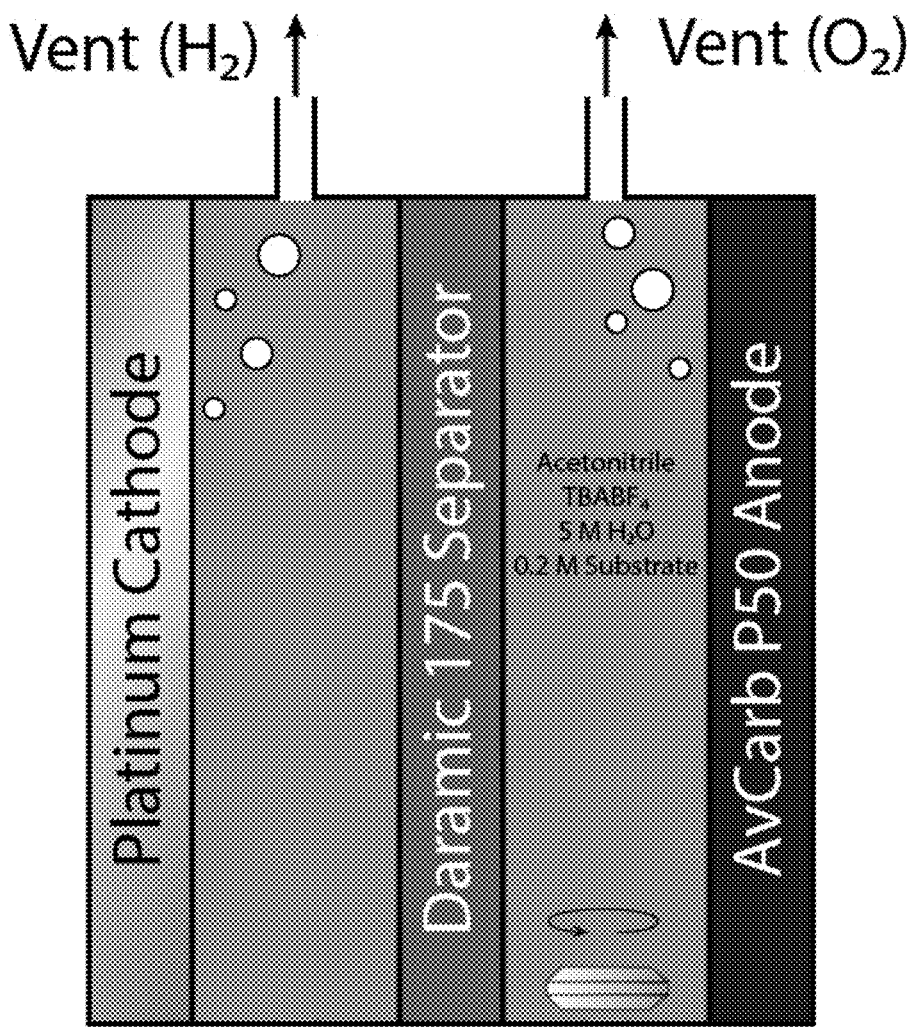
FIG. 28 depicts an electrochemical cell.

A schematic of the electrochemical cell during benzylic C—H oxidation is provided in FIG. 28. The electrolysis is carried out in a two-compartment cell. AvCarb P50 carbon paper backed with hydrophobic Toray 060 carbon paper serves as the anode. Platinum foil is the cathode. A polyporoous polyethylene separator (Daramic 175) is used to minimize the amount of aldehyde product that enters the cathode chamber, since the generated aldehydes can be easily reduced to the corresponding alcohols at the platinum cathode. Convection is provided by a rotating stir bar in the anode compartment, typically set to a rotation rate of 80 RPM. The electrolyte used for the reaction, as in the case of liquid-phase olefin epoxidation, is a mixed system consisting primarily of acetonitrile with 5 M Milli-Q deionized water. Tetrabutylammonium tetrafluoroborate ($TBABF_4$) provides conductivity to the solution. The reactant containing benzylic C—H bonds, or "substrate," is typically added to give a starting concentration of 200 mM.

Figure 29:
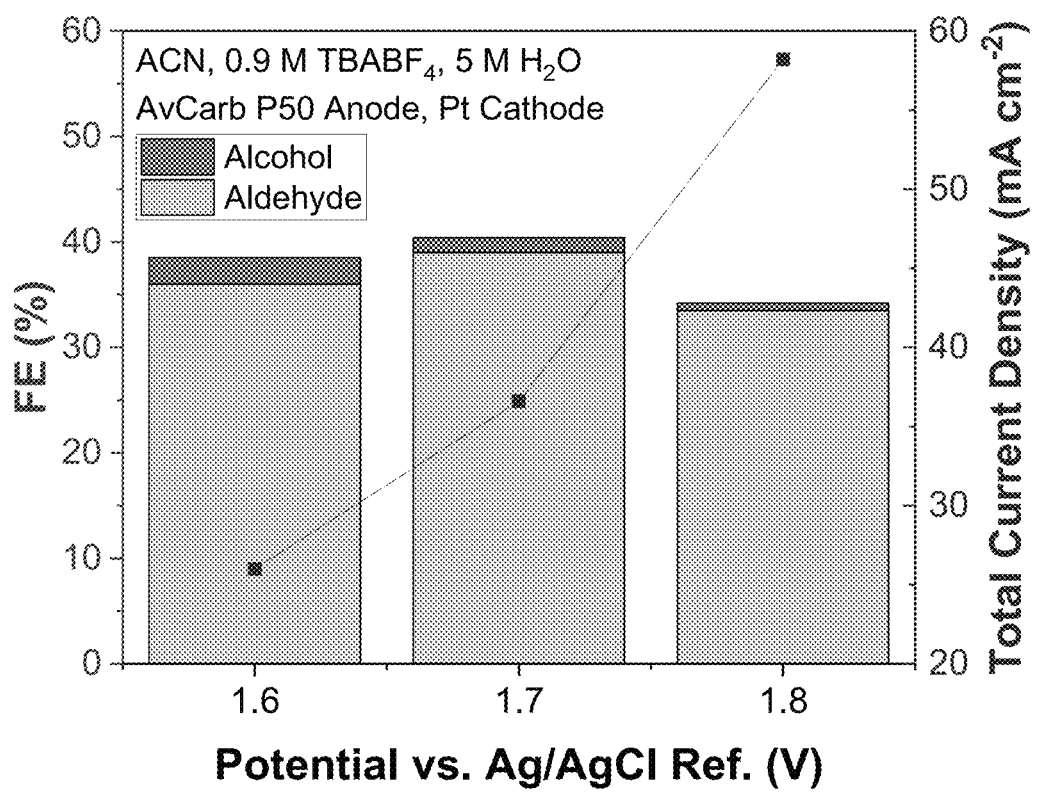
FIG. 29 depicts a graph showing Faradaic efficiency.

By running electrolysis and quantifying products by nuclear magnetic resonance spectroscopy (NMR), we have determined that the reaction of p-xylene with water to form p-tolualdehyde will proceed with nonzero Faradaic efficiency (FE) on most anodes that can withstand the oxidative potentials required for the reaction to take place. This includes various carbon papers and cloths, platinum foil, palladium foil, and fluorine-doped tin oxide (FTO). Metal oxide nanoparticles on carbon paper support do not show significantly different activity for the reaction than bare carbon support. AvCarb P50 has proven to be the anode material yielding both the highest current density and highest FE toward xylene oxidation. FIG. 29 shows FEs and total current densities for tests of p-xylene oxidation using water as the oxygen source over AvCarb P50 anodes. In particular, FIG. 29 depicts FEs toward p-xylene oxidation and total current density at different potentials. "Alcohol" and "Aldehyde" represent 4-methylbenzyl alcohol and p-tolualdehyde, respectively. Note that the data for 1.6 V vs. Ref were acquired at 1.8 V vs. Ref in 0.09 M $TBABF_4$ with 50% IR compensation for ~60 Ohm total resistance. Back-calculation to convert to the potential scale of the 1.7 and 1.8 V experiments gives the potential of roughly 1.6 V vs. Reference.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed is:

1. A method of generating an oxidized substrate comprising:
    contacting an anode including an oxygen atom transfer epoxidation catalyst composition with a substrate, the oxygen atom transfer epoxidation catalyst composition including single atoms of one element of Re, Ir, Pt, Au, Ru, Rh, or Pd supported on a nanostructured material containing an oxide or metal nanoparticle including Ti, Cr, Mn, Co, Ni, Cu, or Zn;
    contacting the anode with a direct oxygen atom source;
    applying a voltage to the anode and a cathode to produce an oxidized substrate;
    wherein the cathode includes a hydrogen generation catalyst; and generating an epoxide and hydrogen gas.

2. The method of claim 1, wherein the oxygen atom transfer epoxidation catalyst composition includes a metal oxide, metal hydroxide, metal phosphate, metal borate, metal sulfide, metal phosphide, or metal nitride, or combinations thereof.

3. The method of claim 1, wherein the oxygen atom transfer epoxidation catalyst composition includes a manganese oxide, a titanium oxide, a copper oxide, a zinc oxide, a cobalt oxide, a cobalt phosphide, an iron oxide, a nickel oxide, an iridium oxide, a platinum oxide, or a chromium oxide.

4. The method of claim 1, wherein the oxidized substrate is produced at a Faradaic yield of at least 20%.

5. The method of claim 1, wherein the oxygen atom source is water without the need to generate a soluble oxidant from the water.

6. The method of claim 1, wherein hydrogen gas is produced at the cathode.

7. The method of claim 6, wherein hydrogen gas is produced at a Faradaic yield of at least 70%.

8. The method of claim 1, wherein the cathode includes an oxygen reduction catalyst.

9. The method of claim 1, wherein oxygen is introduced at the cathode and water is produced.

10. The method of claim 1, wherein a hydrogenation reaction of an organic substrate is conducted at the cathode.

11. The method of claim 1, wherein the substrate is an olefin that is oxidized to form the epoxide.

12. The method of claim 1, wherein the substrate contains a C—H bond oxidized to form a product containing a carbon-oxygen bond.

13. The method of claim 1, wherein the substrate is supplied to the anode at a concentration of 5 mM, 10 mM, 15 mM, 20 mM, 25 mM, 30 mM, 35 mM, 40 mM, 50 mM, 60 mM, 70 mM, 80 mM, 90 mM, 100 mM, 200 mM, 250 mM, 300 mM, 350 mM, 400 mM, 450 mM, 500 mM, 1 M, 2 M, 4 M, 6 M, 8 M, or 10 M.

14. The method of claim 1, wherein the oxygen atom source is supplied at a concentration of 0.1 M, 0.25 M, 0.5 M, 1 M, 2 M, 4 M, 6 M, 8 M, 10 M, 12 M, 14 M, 16 M, 18 M or 20 M.

15. The method of claim 1, wherein the voltage is between about 0.2V and 9.0V.

16. The method of claim 1, wherein the voltage is 0.5V, 0.6V, 0.7V, 0.8V, 0.9V, 1.0V, 1.1V, 1.2V, 1.3V, 1.4V, 1.6V, 1.7V, 1.8V or 1.9V.

17. The method of claim 1, wherein the cathode includes a noble metal, nickel-molybdenum-zinc alloys, cobalt phosphide, or nickel phosphide.

18. The method of claim 1, wherein the method is carried out substantially at room temperature.

* * * * *